United States Patent
Yamada et al.

(10) Patent No.: US 7,116,735 B2
(45) Date of Patent: Oct. 3, 2006

(54) ADAPTIVE EQUALIZATION APPARATUS AND METHOD

(75) Inventors: Takefumi Yamada, Yokohama (JP); Shigeru Tomisato, Yokohama (JP); Tadashi Matsumoto, Ebina (JP)

(73) Assignee: NTT DoCoMo, Inc., Tokyo (JP)

( * ) Notice: Subject to any disclaimer, the term of this patent is extended or adjusted under 35 U.S.C. 154(b) by 755 days.

(21) Appl. No.: 09/984,685

(22) Filed: Oct. 31, 2001

(65) Prior Publication Data

US 2002/0051487 A1  May 2, 2002

(30) Foreign Application Priority Data

Nov. 1, 2000 (JP) ............................. 2000-334723
Apr. 10, 2001 (JP) ............................. 2001-111105

(51) Int. Cl.
*H04L 7/00* (2006.01)
*H04J 3/06* (2006.01)

(52) U.S. Cl. ............... 375/354; 375/365; 375/366; 375/355; 375/229; 375/232; 370/503; 370/510; 370/511

(58) Field of Classification Search ............... 375/11, 375/152, 365, 347; 370/335, 342; 342/378
See application file for complete search history.

(56) References Cited

U.S. PATENT DOCUMENTS

| | | | | |
|---|---|---|---|---|
| 4,811,360 A | * | 3/1989 | Potter ........................... 375/231 |
| 5,159,282 A | * | 10/1992 | Serizawa et al. ........... 329/316 |
| 5,175,558 A | * | 12/1992 | DuPree ........................ 342/378 |
| 5,297,169 A | | 3/1994 | Backström et al. |
| 5,430,712 A | | 7/1995 | Suzuki |
| 5,838,672 A | * | 11/1998 | Ranta ........................... 370/335 |
| 5,838,744 A | * | 11/1998 | Zheng .......................... 375/355 |
| 5,982,763 A | * | 11/1999 | Sato ............................. 370/342 |
| 6,067,295 A | * | 5/2000 | Bahai et al. ................. 370/350 |
| 6,144,711 A | * | 11/2000 | Raleigh et al. .............. 375/347 |
| 6,289,064 B1 | * | 9/2001 | Hiramatsu et al. .......... 375/365 |
| 6,356,586 B1 | * | 3/2002 | Krishnamoorthy et al. . 375/233 |
| 6,507,605 B1 | * | 1/2003 | Fukumoto et al. .......... 375/152 |
| 6,967,993 B1 | * | 11/2005 | Miller ........................... 375/150 |
| 7,027,500 B1 | * | 4/2006 | Casas et al. ................. 375/232 |

FOREIGN PATENT DOCUMENTS

EP 0 496 152 7/1992

* cited by examiner

*Primary Examiner*—Dac Ha
*Assistant Examiner*—Linda Wong
(74) *Attorney, Agent, or Firm*—Oblon, Spivak, McClelland, Maier & Neustadt, P.C.

(57) ABSTRACT

A correlation between a received signal and a sync word signal is calculated. A window signal having a time span which is equal to an equalization range for an adaptive equalizer is defined. A power sum of the correlation output signal in each of window signals #1, #2, #3, . . . are calculated by sequentially shifting the window signal in the time domain, and a rising edge of the particular window signal whose power sum maximum defines a symbol sync timing.

19 Claims, 25 Drawing Sheets

ADAPTIVE EQUALIZATION APPARATUS AND METHOD

FIELD OF THE INVENTION

The present invention relates to an adaptive equalization apparatus and an associated method for eliminating interferences which can be utilized in mobile communication, for example, and in particular, to means and method for generating symbol synchronization timings which allow the adaptive equalizations to do effectively.

BACKGROUND OF THE INVENTION

An adaptive equalizer is known in the mobile communication as a technology which can be used to eliminate interferences. The adaptive equalizer has long been used to combine and/or eliminate inter-symbol interferences as occurring between direct signals and delayed signals which have different delay times each other from a common origin. A conventional example of a technique of detecting a symbol sync timing for a received signal which is used in an adaptive equalizer will be described below. According to the conventional technique, the symbol timing has been synchronized with the 1st path representing a path having the eariest arrival. An arrangement for this instance is shown in FIG. 1. While not shown, a transmitter initially transmits a long-termed sync word sequence whose pattern is already known to the receiving side, followed by the transmission of data representing information content to be transmitted. On the receiver side, a received signal from the transmitter is amplified and demodulated into a baseband signal, which is then converted into a digital sequence. The received signal in the form of the digital sequence is input to an input terminal 11, and a channel response is estimated by using a correlation between the received signal and a sync word signal from a sync word generator 12 in a correlator 13. The channel response or the output signal from the correlator 13 changes, for example, in a manner illustrated in FIG. 2. The correlation output signal Sigc is compared with threshold signal Ths from a threshold signal presetter 14 in a symbol sync timing generator 15. A first timing t1 when the correlation output signal Sigc exceeds the threshold signal Ths is detected, thus obtaining a symbol sync timing for the 1st arrival path. A sampler 16 samples a digitized received signal from the input terminal 11 with the symbol sync timing signal, and a sampled output signal is fed to an adaptive equalizer 17, which applies an adaptive equalization to the sampled signal to deliver a decided symbol sequence to an output terminal 18.

In the conventional technique in which the symbol sync timing is set to the timing of 1st arriving path, there is a problem that if an equalization rage is limited in the time domain, there may occur a correlation output signal having a substantial power located outside the equalization range, resulting in a failure to achieve significant performances and thus a degradation in the response.

SUMMARY OF THE INVENTION

In accordance with the present invention, a power sum of the correlation output signals obtained from the correlator within a given time span which is greater than at least one symbol length, preferably equal to or greater than a length substantially equivalent to the equalization range of the adaptive equalizer, is calculated while shifting the given time span in time. According to one aspect of the invention, a timing is detected when the power sum is at its maximum, and the symbol sync timing is generated on the basis of this timing. According to another aspect of the invention, a timing is detected where the power sum exceeds the threshold for the first time, and the symbol sync timing is generated on the basis of this timing.

This arrangement allows the path power sum within the equalization range of the adaptive equalizer to be maximized, enabling an effective equalization processing. As a consequence, a good reception characteristic can be expected.

DESCRIPTION OF EMBODIMENTS

First Embodiment

Figure 1:
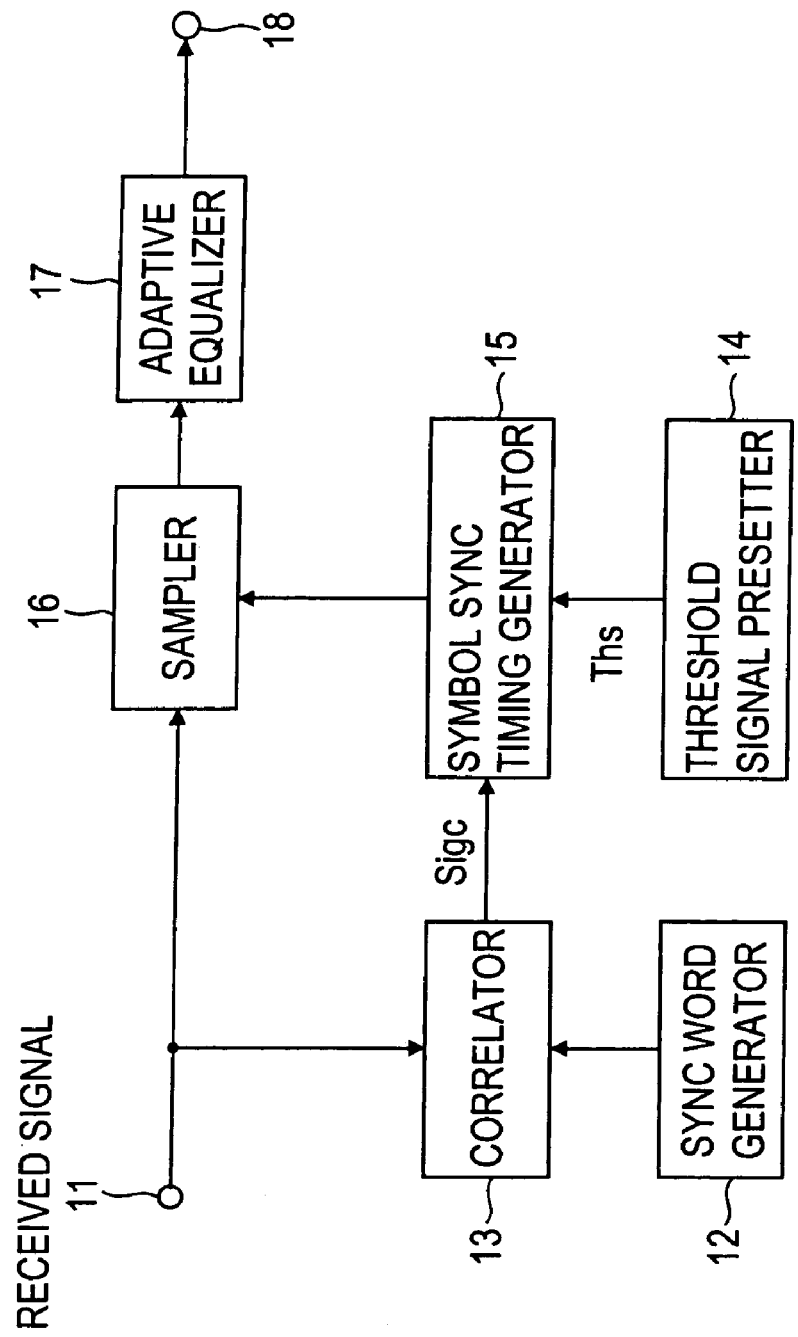
FIG. 1 is a schematic view showing a functional arrangement of a conventional adaptive equalization apparatus.
Figure 2:
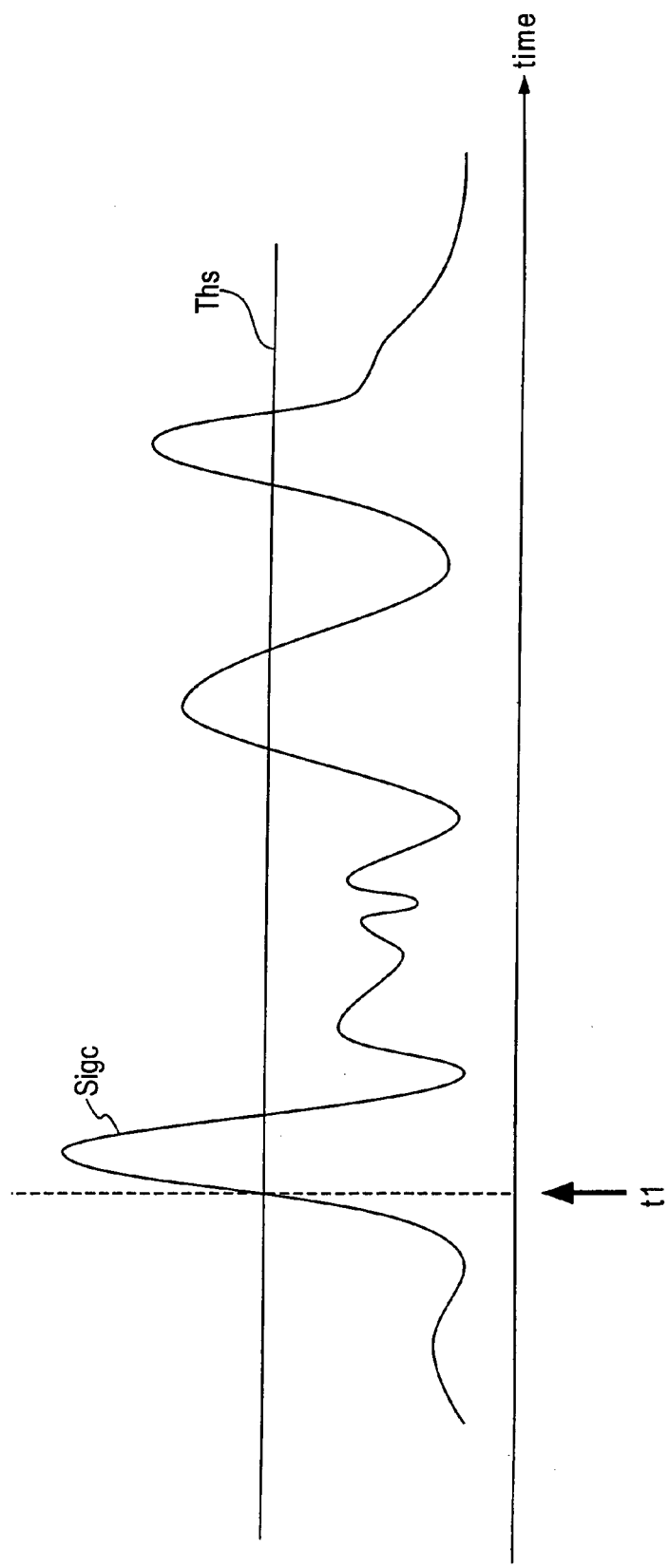
FIG. 2 is a waveform diagram showing an example of a correlation output signal and a detected timing provided by conventional symbol timing means.
Figure 3:
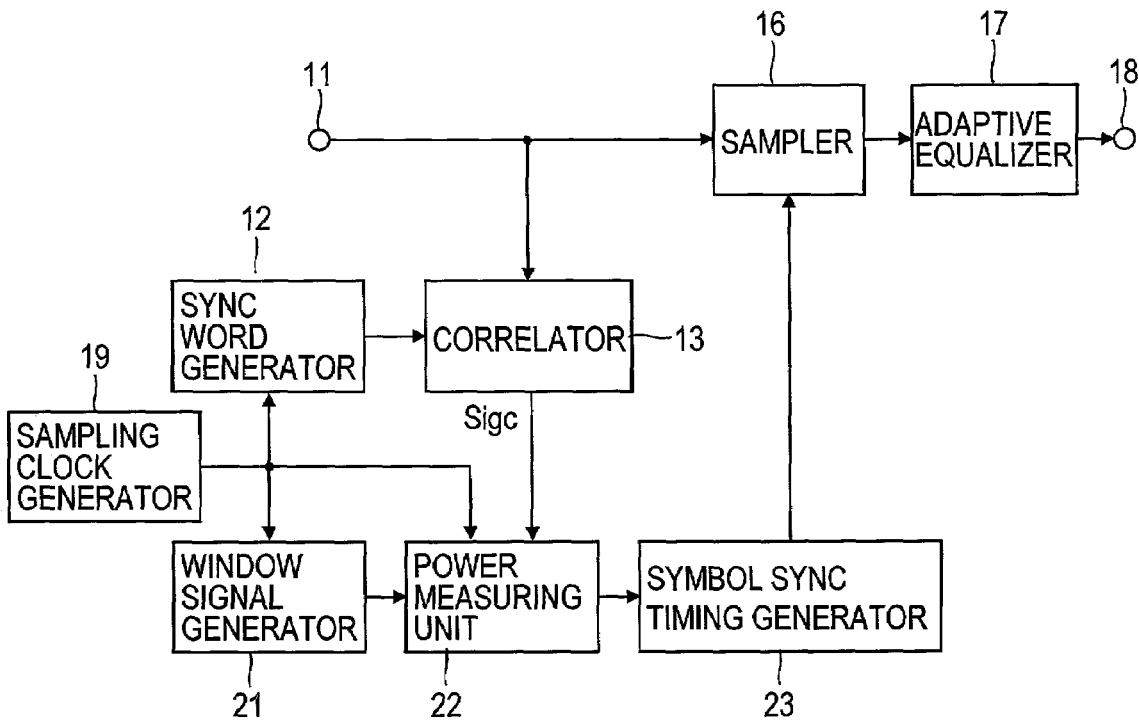
FIG. 3 is a schematic view showing a functional arrangement of a first embodiment of the present invention.

An arrangement of a first embodiment of the present invention is shown in FIG. 3 using similar reference numerals as in FIG. 1 to designate corresponding parts. A correlator 13 outputs a correlation between a sync word signal generated by a sync word generator 12 and a received signal from an input terminal 11. As used in the conventional systems, the sync word signal used may comprise a symbol pattern such as PN sequences, for example, which provides a high self-correlation and a low cross correlation with interferences and allow a symbol timing of a desired signal to be detected while eliminating the influence of interfering waves.

Figure 4A:
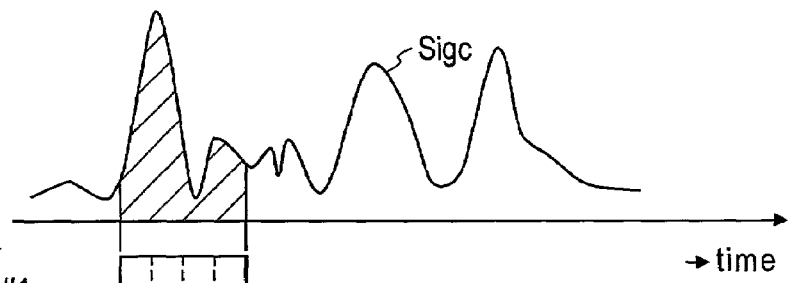
FIG. 4 is a waveform diagram showing an exemplary relationship between a correlation output signal and a window signal which are used according to the present invention.
Figure 4B:
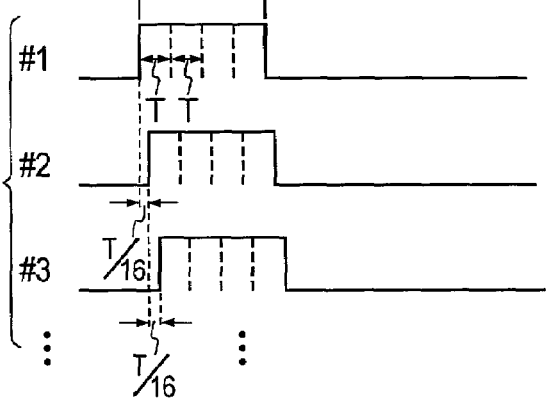

On the other hand, in the present embodiment, a power measuring unit 22 is used to calculate a sum of correlation outputs Sigc which occur within a given time span while sequentially shifting the time span in the time domain. For example, a window signal generator 21 provides a window signal having the same time span as the equalization range of an adaptive equalizer 17. By way of example, when the equalization range is equal to four symbols delay, a window signal is generated which assumes 1 during a time span 4T (where T represents a symbol period) and assumes 0 otherwise. The window signal is input to the power measuring unit 22 together with the correlation output signals Sigc. The power measuring unit 22 then sequentially calculates a power sum of the correlation output signals Sigc which occur during the extent of the window signal while shifting the time position of the window signal, as illustrated in FIG. 4. The baseband received signal form the input terminal 11 represents a sequence which is sampled at an interval equal to 1/16 the symbol period T, for example, and then digitized, and the sync word signal from the sync word generator 12 also comprises a digitized sequence having the same period. Consequently, the correlation output signals Sigc are also a digital sequence having the same period. FIG. 4A shows an example of the correlation output signal Sigc in the form of a continuous wave for the purpose of convenience. FIG. 4B shows a window signal #1 which assumes 1 level only during the time interval of the equalization range, which is shown as 4T span in this example, and which assumes 0 level otherwise. Similarly, window signals #2, #3, . . . are formed which are sequentially shifted from the window signal #1 by a sampling period of the correlation output signal, which is T/16 in this example, in a sequential manner. In this manner, the sum of the correlation output signal Sigc is calculated while the level of window signals #1, #2, #3, . . . is 1. Specifically, for the window signal #1, the sum of the correlation output signal which is shown hatched in FIG. 4A is calculated.

Figure 5A:
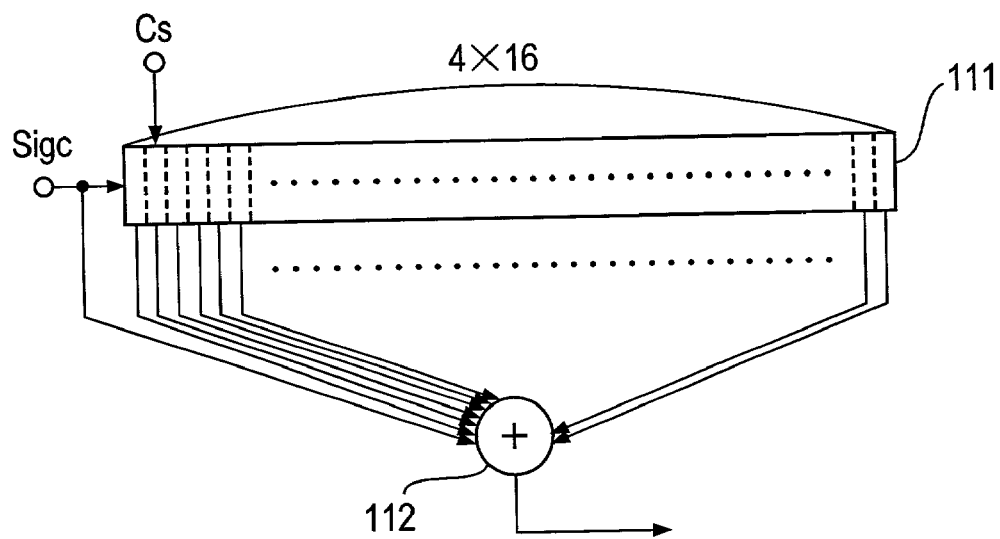
FIG. 5A is a schematic view of a specific example of a power measuring unit shown in FIG. 3.
Figure 5B:
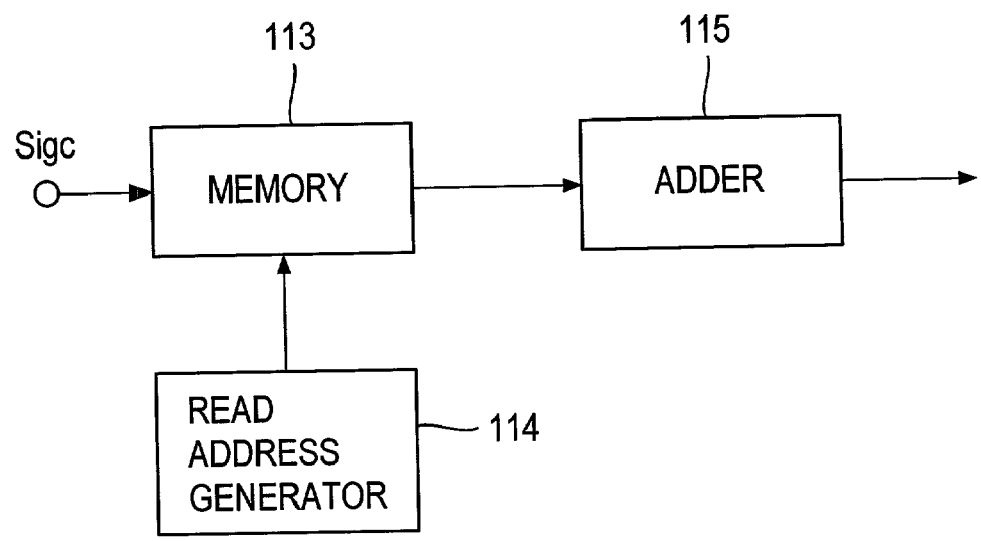
FIG. 5B is a diagram showing another example.

To give a specific example of the power measuring unit 22 for the above example in which the given time span is equal to 4T and the sampling period for the received signal is equal to T/16, there may be provided a shift register 111 having (4×16) shift stages, as shown in FIG. 5A, using correlation output signal Sigc as an input to one end of the shift register 111, which is then clocked with a clock Cs of T/16. A sum of the input and the output of each shift stage may be formed by an adder 112, whereby the power sum within the window signal which is sequentially shifted by T/16 is formed every T/16. Alternatively, as shown in FIG. 5B, the correlation output signal from the correlator 13 may be written into a memory 113 every T/16, and when the correlation output signal which corresponds to the end of the sync word signal has been written into, a read address generator 114 may be caused to deliver (4×16) addresses corresponding to the data for 4T interval in order to read stored data from the memory 113, and the read data for 4×16 addresses (correlation output signals) are added together in an adder 115. Subsequently, (4×16) read addresses which are by one address displaced from the first set of addresses are generated to read stored data from the memory 113 and such data added together by the adder 115. The same process may be repeated. In this instance, the adder 115 may merely subtract the first occurring data from the added sum for the initial (4×16) data and add the data at the new address to the added sum. The data in the memory may be read out in parallel before the completion of writing into the memory 113.

The amount by which the window signal is offset is not limited to a sampling period of the correlation output signal Sigc, but may be an integral multiple such as twice to four times, for example, or greater. It is to be noted however that the smaller the offset of the window signal, the greater the accuracy of the symbol sync timing determined. In FIG. 3, a sampling clock which is used when digitizing the received signal input to the input terminal 11 into a digital sequence is delivered from a sampling clock generator 19 to the sync word generator 12, the window signal generator 21 and the power measuring unit 22 for purpose of timing alignment.

However, when the shift register as described above with reference to FIG. 5A is used to calculate the power sum, there is no need for the window signal generator 21.

A symbol sync timing generator 23 generates a symbol sync timing using that timing where a maximum one of the power sums delivered from the power measuring unit 22 is obtained. When the window signal as shown in FIG. 4 is used, the symbol sync timing may be chosen as the timing of the rising edge of the particular window signal which provided a maximum power sum.

It is described above that the time span of the window signal or the given time span during which the power measuring unit 22 calculates the power sum be preferably chosen to be comparable to the equalization range of the adaptive equalizer 17, but the time length of the window signal should be at least equal to one symbol period or greater and there is no upper limit. However, for practical purposes, it is contemplated that the time span be chosen to be on the order of twice the time extent of the equalization range. The number of the power sums which are calculated by the power measuring unit 22 should be at least equal to two, and the maximum one of the power sums may be determined among the window signals which are sequentially shifted from the occurrence to the end of the sync word signal. Alternatively, when the power sums which are sequentially determined are reduced below a threshold value, and if such condition continues over a given number of times, a further derivation of the power sums may be ceased and a maximum one may be determined from the power sums which are already obtained. In addition, when beginning to determine the power sums, those power sums which are obtained after exceeding the threshold may be chosen as effective ones optionally, and the maximum may be chosen from these power sums.

Figure 6:
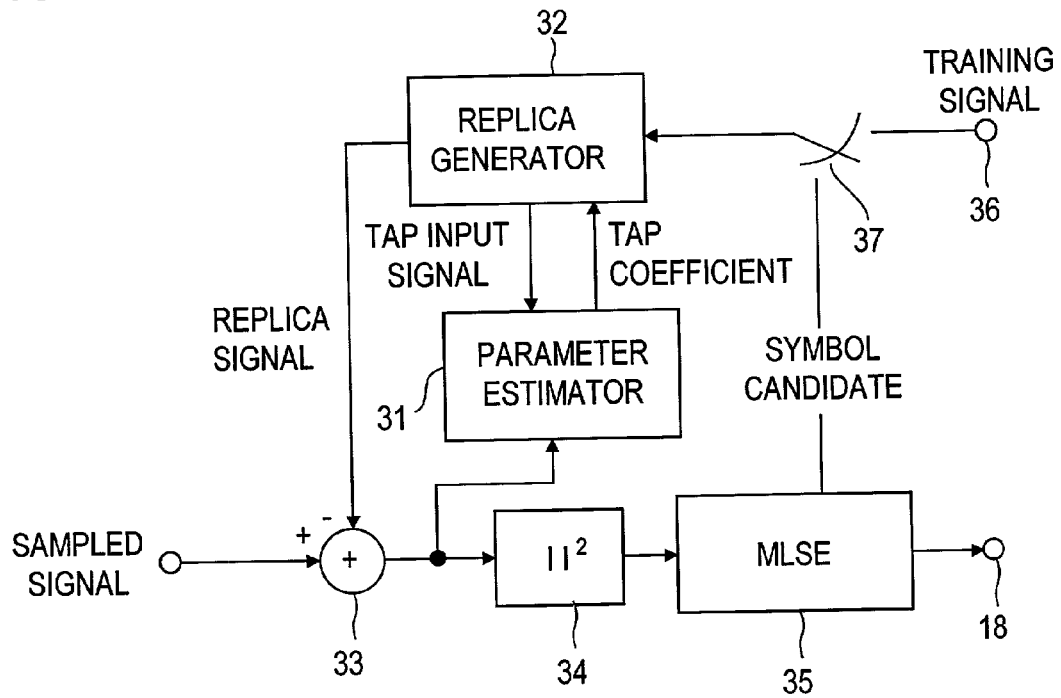
FIG. 6 is a schematic view showing an exemplary functional arrangement of an adaptive equalizer 17 (MLSE type adaptive equalizer) shown in FIG. 3.
Figure 7:
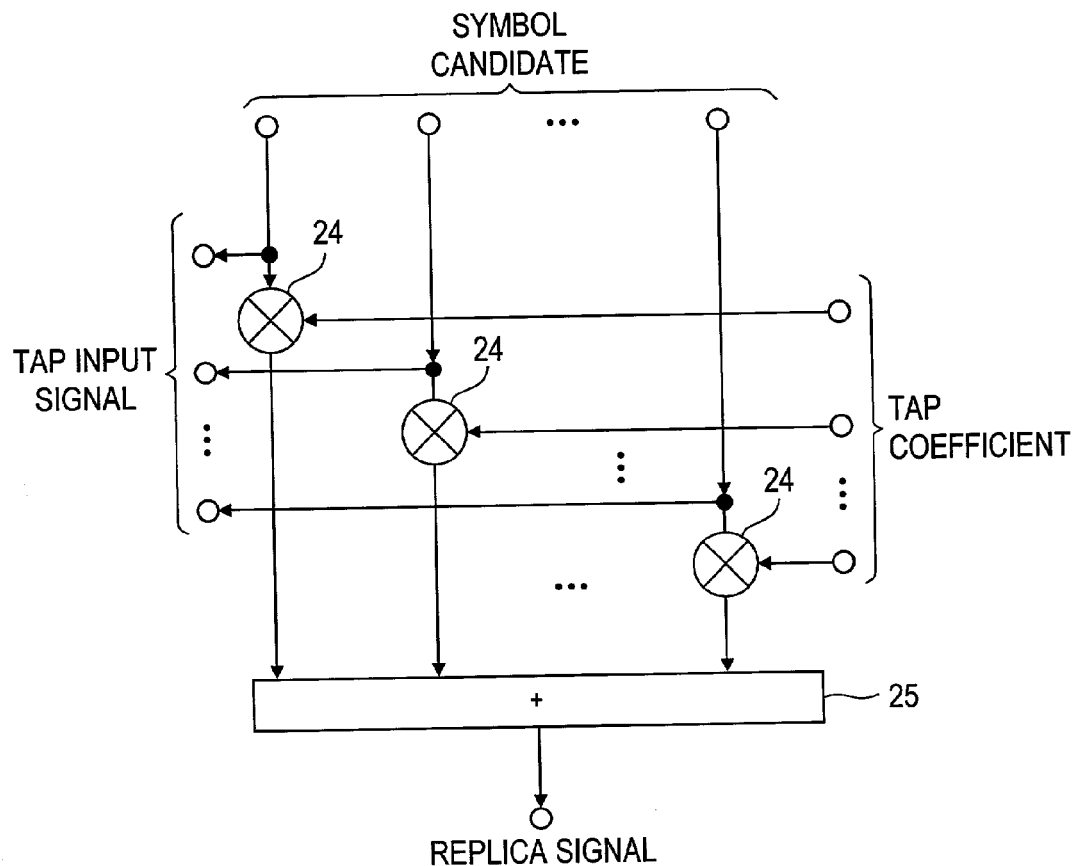
FIG. 7 is a schematic view showing an exemplary arrangement of a replica generator 32 shown in FIG. 6.
Figure 8:
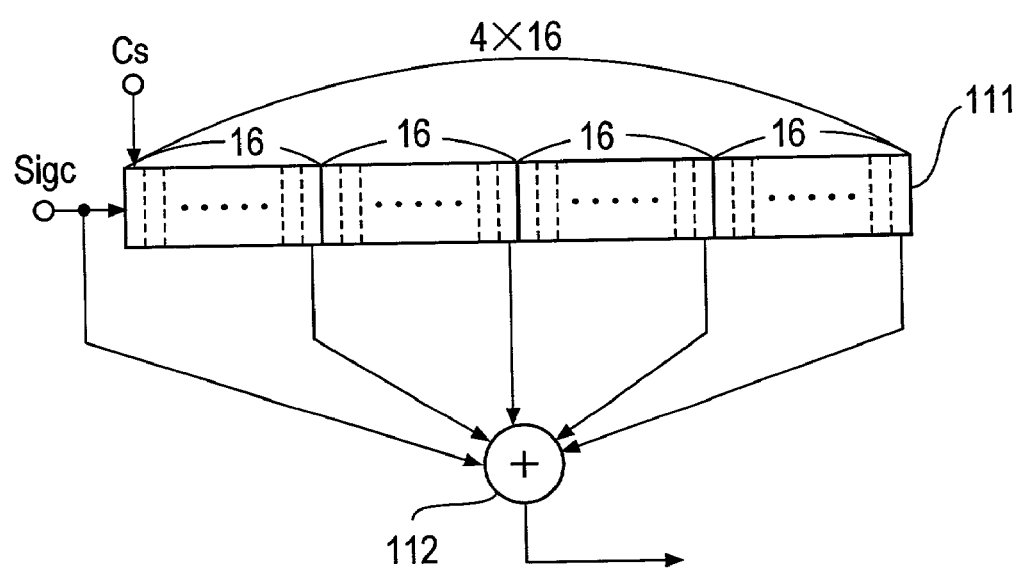
FIG. 8 is a schematic view showing a specific example of a power measuring unit 22 used in a second embodiment of the invention.

The sampler 16 samples the received signal using the symbol sync timing signal. The sampled signals from the sampler 16 are input to the adaptive equalizer 17 which applies an equalization processing thereto. An exemplary arrangement of the adaptive equalizer 17 is shown in FIG. 6. This arrangement is referred to as MLSE (Maximum Likelihood Sequence Estimation) type, and equalizes the received signal by performing the maximum likelihood sequence estimation (see, for example, J. G. Proakis "Digital Communications, 3rd Edition", Mc Graw-Hill, pp. 249–254 (1995)). With this adaptive equalizer, a symbol candidate signal for the received signal is initially formed. When a band limitation or a coding processing is applied during the transmission, the symbol candidate signal is formed with due considerations thereto. The symbol candidate signal is then subject, in a replica generator 32, to a complex multiplication with tap coefficients which are delivered from a parameter estimator 31, and a replica of the received signal is formed by the conbinations of the result of multiplications. An exemplary arrangement of the replica generator 32 is shown in FIG. 7. It comprises a plurality of complex multipliers 24 each performing a complex multiplication of the symbol candidate signal with respective tap coefficients, and a complex adder 25 which adds these results of multiplications together. The symbol candidate signals which are input to the respective complex multipliers 14 are delivered to the parameter estimator 31 as tap input signals.

A difference between the replica signal and the input signal of the adaptive equalizer (or the output signal from the sampler 16) is formed in an adder 33 to produce an estimated error signal. The estimated error signal is normally squared in a squarer 34, and the squared value is used as a branch metric of a Viterbi algorithm which is used in performing the maximum likelihood sequence estimation in the maximum likelihood sequence estimator (MLSE) 35. Finally, a most likely symbol pattern which is obtained by the Viterbi algorithm is delivered as a decided sequence to an output terminal 18, thus demodulating the received sequence. On the other hand, the parameter estimator 31 updates the tap coefficients using the estimated error signal and the tap input signals. An adaptive algorithm may be used in updating the coefficients, and an LMS (Least Mean Square) and an RMS (Recursive Least Square) algorithm may be used at this end (see, for example, J. G. Proakis "Digital Communications, 3rd Edition", Mc Graw-Hill, pp. 639–644 and pp. 654–660 (1995)). To achieve an initial convergence of the tap coefficients, the symbol candidate signals from MLSE processor 35 may be replaced by a training signal whose symbol pattern is known on the receiving side, and which is applied from a terminal 36 through a change-over switch 37 to the replica generator 32. Specifically, the training signal may be used at first in place of the symbol candidate signals to cause a convergence of the tap coefficients, whereupon the switch 37 may be thrown to the side of MLSE 35 to use the symbol candidate signals for equalization of the received signals. For the adaptive equalizer, see, for example, J. G. Proakis "Digital Communications, 3rd Edition", Mc Graw-Hill, pp. 636–676 (1995)).

As described above, according to the first embodiment, the sync timing is produced by the symbol sync timing generator 23 which provides a maximum power within the given time span (window signal). Accordingly, the path power which can be combined by the adaptive equalizer 17 is maximized. As a result, this provides an advantageous desired signal power vs. noise power ratio in comparison to a conventional symbol sync timing generator, allowing the transmission performances to be improved. It is to be noted that sampling period for symbol sync timing generator 23 is not limited to one symbol period. For example, where the adaptive equalizer 17 comprises a linear equalizer having a transversal filter with an interval equal to ½ symbol period, a sampling operation by the sampler 16 takes place with ½ symbol period.

Second Embodiment

A difference of the second embodiment over the first embodiment of the invention resides in the technique of measuring the power of the correlation signal in the power measuring unit 22. In the replica generator 32 used in the adaptive equalizer, tap input signals are provided at a given time interval, as illustrated in FIG. 7, and accordingly, the equalization takes place with respect to the received signal which is sampled at this time interval. Accordingly, by determining the symbol sync timing in consideration of the time interval in the replica generator 32, there can be obtained a path diversity gain more effectively. The tap interval in the adaptive equalizer is often equal to one symbol interval, and in this instance, the power measuring unit 22 uses the following power measuring technique.

The correlation output signal within the extent of the window signal is sampled at the symbol interval, and a power sum of these sampled signals is calculated. This operation is repeated while shifting the time position of the window signal. If the window signal has a time span of 4T in FIG. 4, a sum of five sampled values from the correlation output signal at timings indicated by the opposite edges of each of the window signals #1, #2, #3, . . . and three broken lines, as shown in FIG. 4B is calculated. When the shift register shown in FIG. 5A is used to calculate the power sum of the correlation output signal Sigc, 4×16 stage shift register 111, similar to that shown in FIG. 5A, is used and is clocked by a sampling clock Cs (an output from the sampling clock generator 19 shown in FIG. 3) to download the correlation output signal Sigc, and the input signal and an output from every 16 shift stages are added together in an adder 112. The added value (power sum) is delivered every T/16.

The symbol sync timing generator 23 detects a timing when a maximum one of the power sums is obtained. This technique allows the timing when a maximum path diversity gain is obtained to be detected even in an environment in which the incoming paths of the received signal are distributed at an irregular interval rather than by the symbol interval. The interval between successive sums of the correlation output signal in the second embodiment may be similar to the sampling interval by the sampler 16 shown in FIG. 3, and is not necessarily equal to one symbol interval.

Third Embodiment

Figure 9:
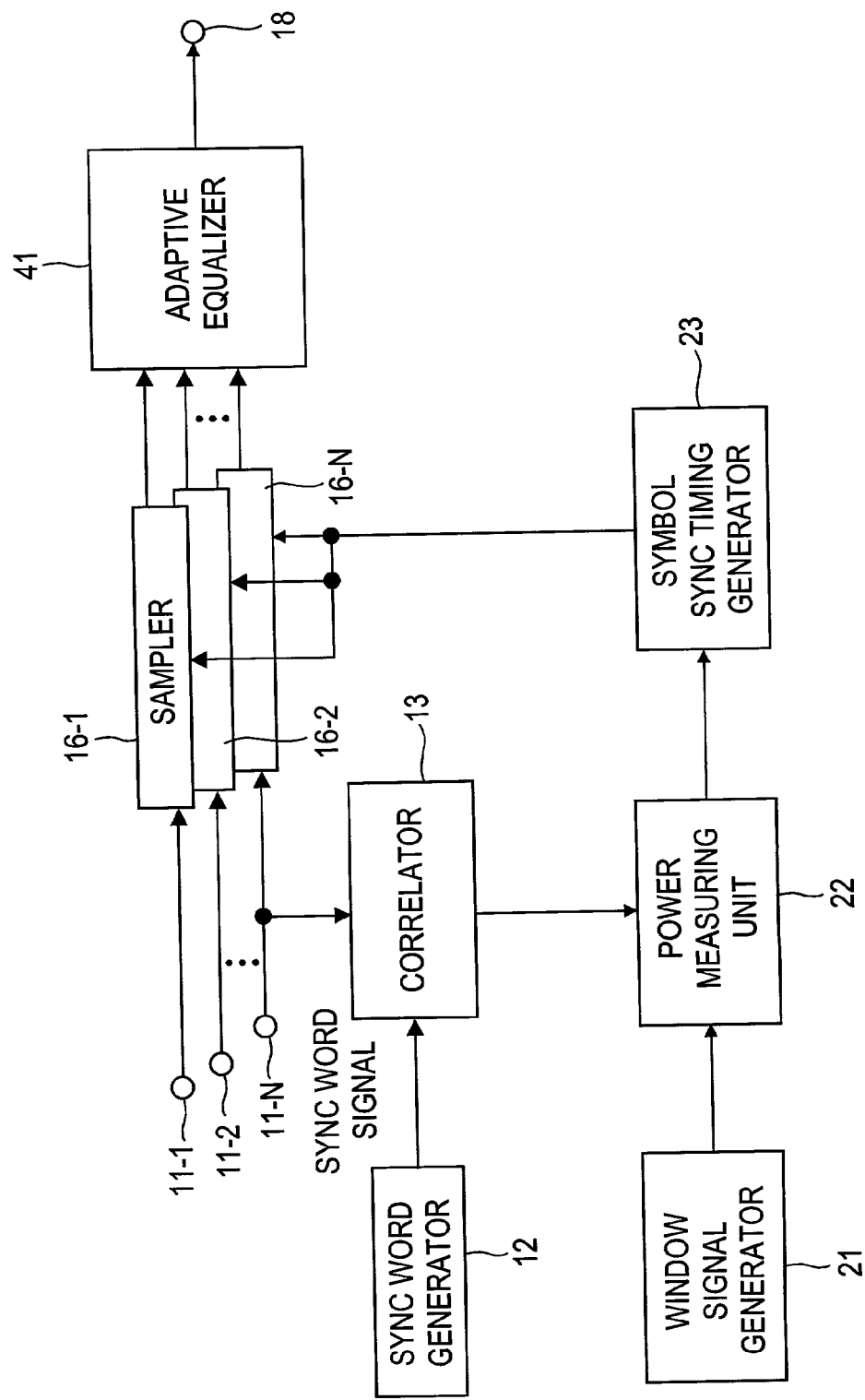
FIG. 9 is a schematic view showing an exemplary functional arrangement of a third embodiment of the invention.

An arrangement of a third embodiment of the invention is shown in FIG. 9 using corresponding reference numerals as used in FIG. 3 to designate similar parts. In this embodiment, adaptive equalizers provides a time and space equalization combining an adaptive array antenna processing and an adaptive equalization processing.

The adaptive array antenna produces a beam pattern which directs a beam having a relatively high antenna gain in the direction of a desired signal on which an own signal is placed while directing nulls having a considerably reduced relative gain in the direction of interfering signals carrying other users'signals according to changes of the signal condition in an adaptive manner. Thus, this is a technique which is effective in eliminating a co-channel interference occurring between interfering signals which utilize a common frequency (channel). A combination of the adaptive array antenna and an adaptive equalizer constitutes a time and space equalizer. For details of the adaptive array antenna, see, for example, R. T. Compton, Jr., "Adaptive Antennas-Concepts and Performance", Prentice-Hall, Englewood Cliffs (1988).

With the time and space equalizer, a long delayed path or a co-channel interference whose delay is too long for the adaptive equalizer to equalize exceeded is eliminated by the adaptive array antenna while the adaptive equalizer applies an equalization to a delayed paths whose delay is short enough to equalize. By adding the equalization in the space region, it is possible to equalize with a reasonable complexity of hardware even in a propagation environment which is so complex that the hardware implementation is too difficult for a signal processing in the time domain.

Figure 10:
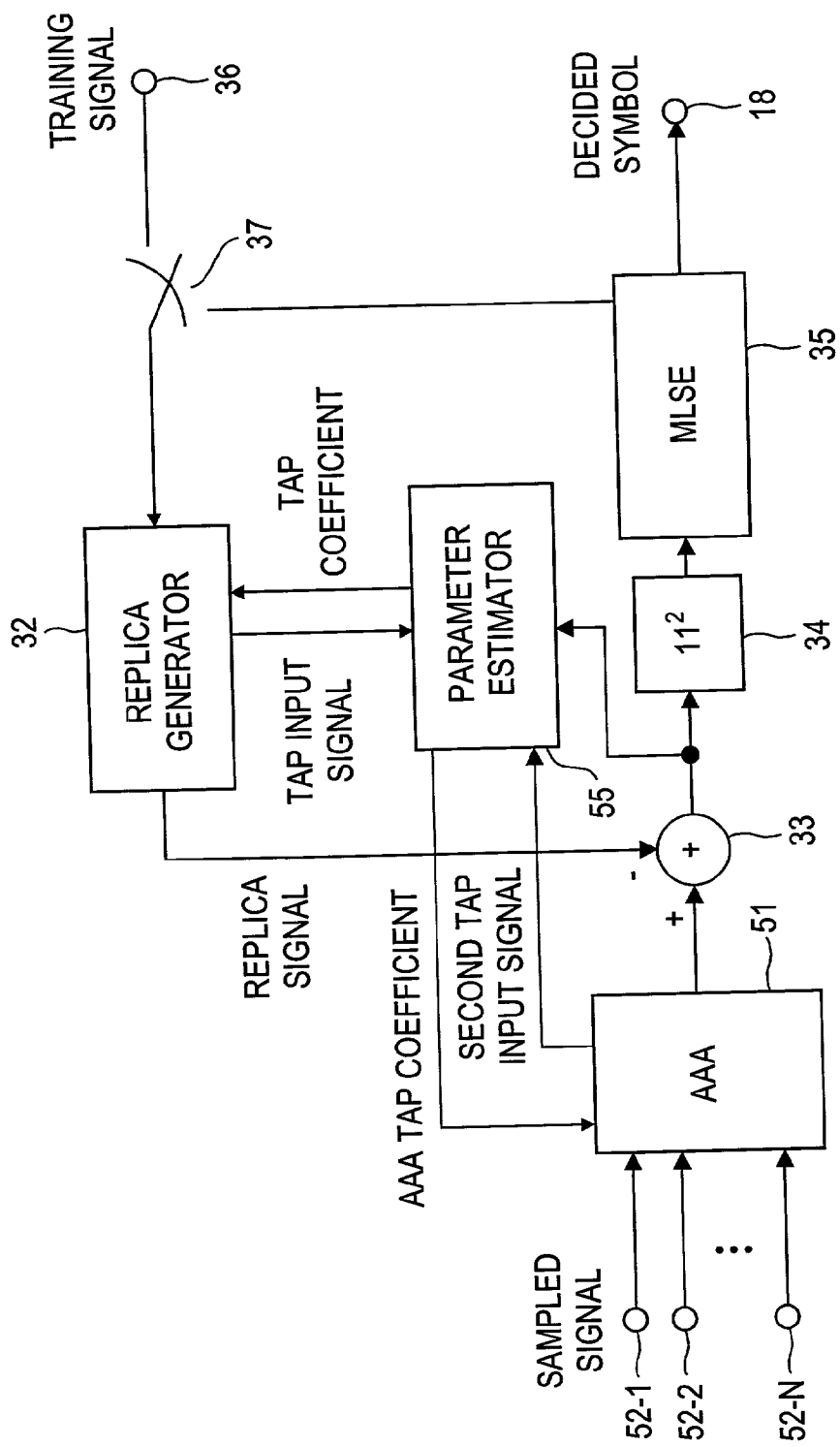
FIG. 10 is a schematic view showing an exemplary functional arrangement of an adaptive equalizer 41 shown in FIG. 9.
Figure 11:
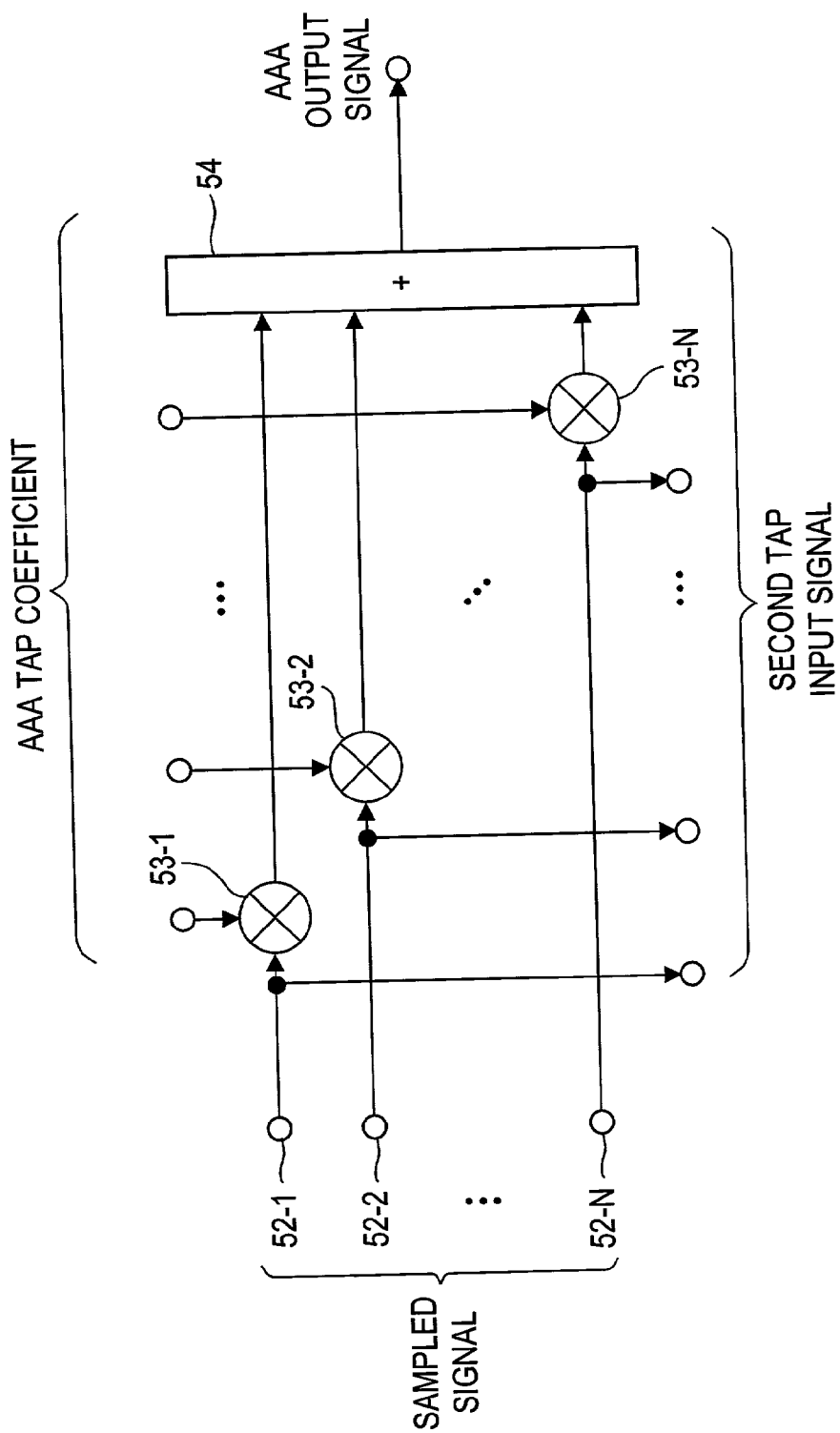
FIG. 11 is a schematic view of an exemplary arrangement of an adaptive array antenna combiner 51 shown in FIG. 9.

Referring to FIG. 9, a received signal from each element of the adaptive array antenna is input to input terminals 11-1 to 11-N as a baseband signal (which is digitized), and the received signals in these N channels are sampled by samplers 16-1 to 16-N using symbol sync timing signals. The resulting sampled signals of N channels are input to an adaptive equalizer 41 where an equalization is applied. An exemplary arrangement of the adaptive equalizer 41 used in this embodiment is shown in FIG. 10. A distinction from the adaptive equalizer shown in FIG. 6 resides in the provision of an adaptive array antenna processing combiner 51. Sampled signals of N channels fed from terminals 52-1 to 52-N are combined by the adaptive array antenna processing combiner 51, and the equalization processing is applied to the combined signal. An exemplary arrangement of the adaptive array antenna processing combiner is shown in FIG. 11. As shown, there are provided a plurality of complex multipliers 53-1 to 53-N which perform a complex multiplication between sampled signals of N channels from the terminals 52-1 to 52-N and N adaptive array antenna (AAA) tap coefficients, and a complex adder 54 which performs a complex addition of outputs from the plurality of complex multipliers. The tap coefficients which are used in the adaptive array antenna processing combiner 51 are provided by a parameter estimator 55, and can be calculated using the estimated error signal and the second tap input signals which are fed to the complex multipliers 53-1 to 53-N of the adaptive array antenna processing combiner 51. For details of the time and space equalizer, see, for example, Ryuji Kohno, "Spatial and Temporal Communications Theory Using Adaptive Antenna Array", IEEE Personal Communications, pp. 28–35, February 1998, and A. J. Paulraj and B. C. Ng, "Space-Time Modems for wireless Personal Communications", IEEE Personal Communications, pp. 36–48, February 1998.

In this embodiment, the received signals are in N channels, but it is sufficient that a received signal in one of channels is used to provide a correlation with a sync word signal in a correlator 13. However, when correlations between a plurality of received signals and the sync word signal are obtained, and the correlation output signals are added together and averaged, for example, a correlation output signal of an improved accuracy can be provided.

Fourth Embodiment

Figure 12:
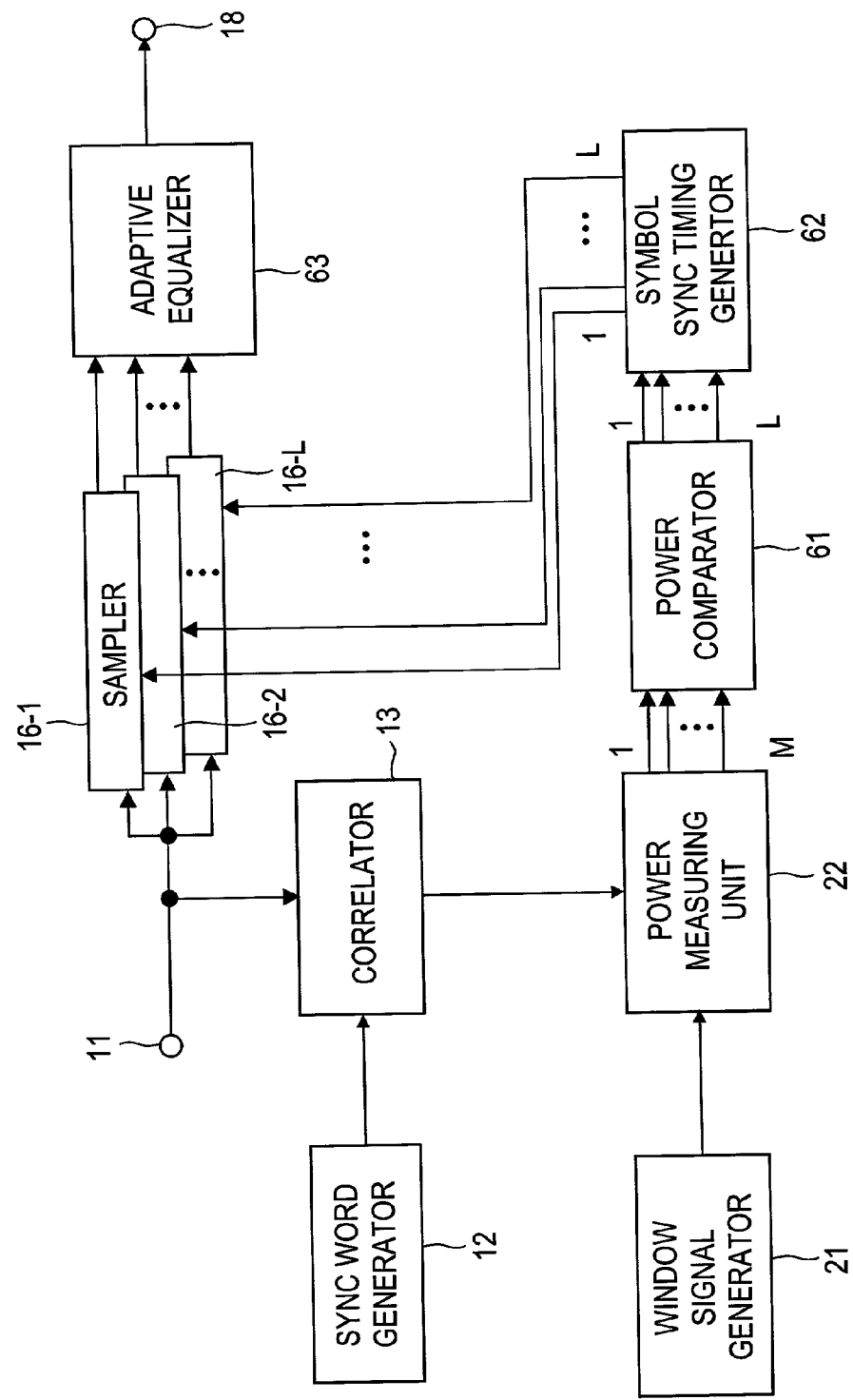
FIG. 12 is a schematic view showing an exemplary functional arrangement of a fourth embodiment of the invention.

An arrangement of a fourth embodiment of the invention is shown in FIG. 12. It is to be noted that parts other than a power comparator 61 and a symbol sync timing generator 62 remain similar to those shown in the first embodiment of FIG. 3 and in the second embodiment. The power comparator 61 compares the power sums which are obtained by the power measuring unit 22 with each other, and selects L timing points (where L is an integer equal to or greater than 1) in the sequence of greatest power sums. If L is equal to 1, this embodiment is reduced to the first embodiment. It will be noted that a maximum value of L is equal to the number of the power sums which are calculated by the power measuring unit 22, but it may be determined in consideration of the scale of the hardware. The symbol sync timing generator 62 delivers symbol sync timing signals which depend on the timings of the selected L power sums. In this embodiment, there are provided a plurality of samplers 16-1 to 16-L which correspond each to the L symbol sync timing signals, and each of the samplers 16-1 to 16-L samples a received signal from an input terminal 11 with one of L symbol sync timing signals fed from the symbol sync timing generator 62. An adaptive equalizer 63 applies an equalization processing to these L sampled signals.

Figure 13:
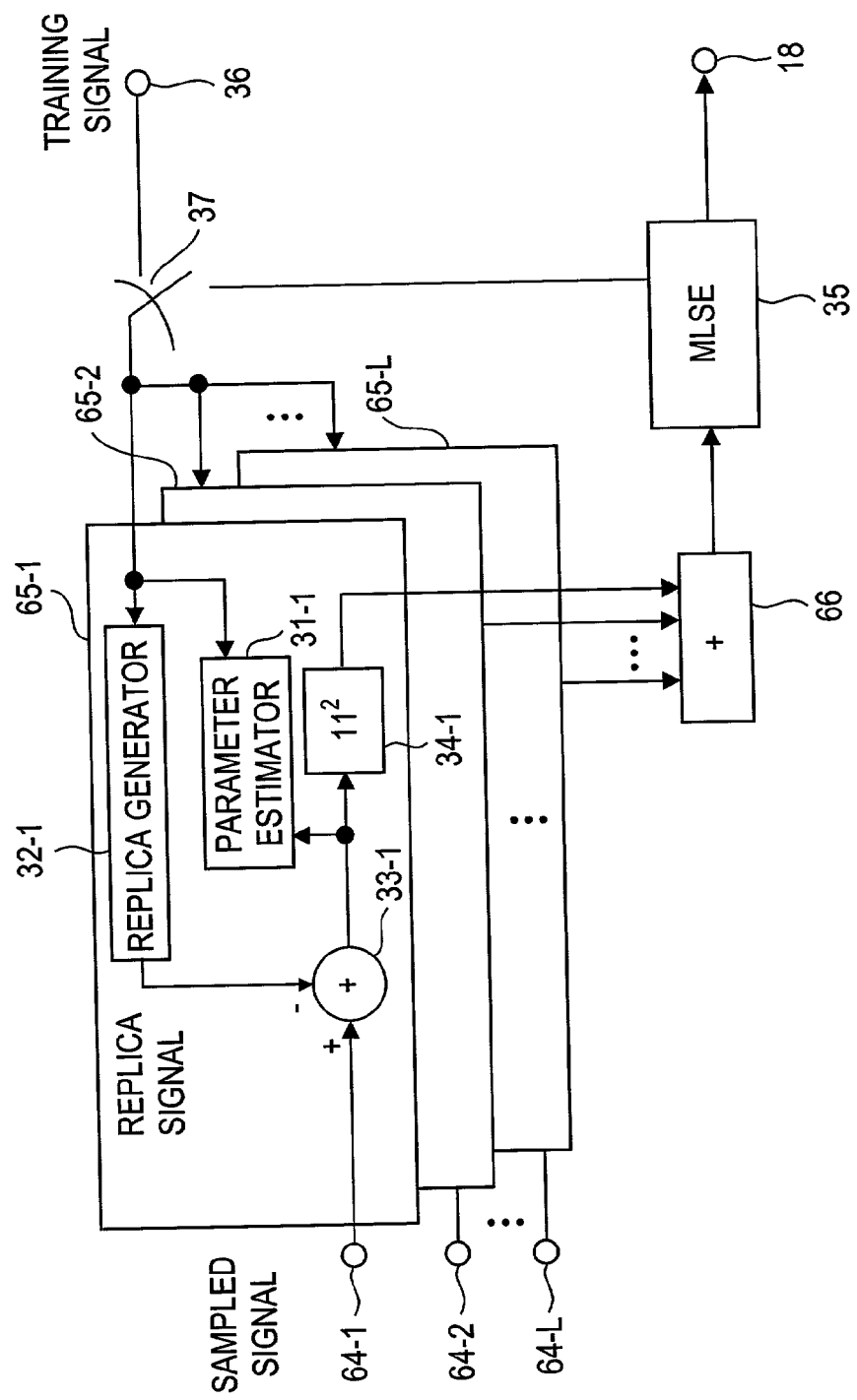
FIG. 13 is a schematic view showing an exemplary functional arrangement of an adaptive equalizer 63 shown in FIG. 12.

FIG. 13 shows an exemplary arrangement of the adaptive equalizer 63. Sampled signals from the samplers 16-1 to 16-L are applied from corresponding terminals 64-1 to 64-L to estimated error output sections 65-1 to 65-L, respectively. As shown for the estimated error output section 65-1, it comprises a parameter estimator 31-1, a replica generator 32-1, an adder 33-1 and a squarer 34-1 in a similar manner as shown in FIG. 6, and remaining timing corresponding processors 65-2 to 65-L each also include a parameter estimator, a replica generator, an adder and a squarer. In this example, the generation of replicas and the estimation of parameters take place for each of L symbol sync timings, and a squared value of an estimated error signal from each adder is added together in an adder 66 to be used as a branch metric to perform MLSE processing in an MLSE processor 35. The MLSE processor 35 maybe replaced by a different adaptive equalization processor.

Figure 14:
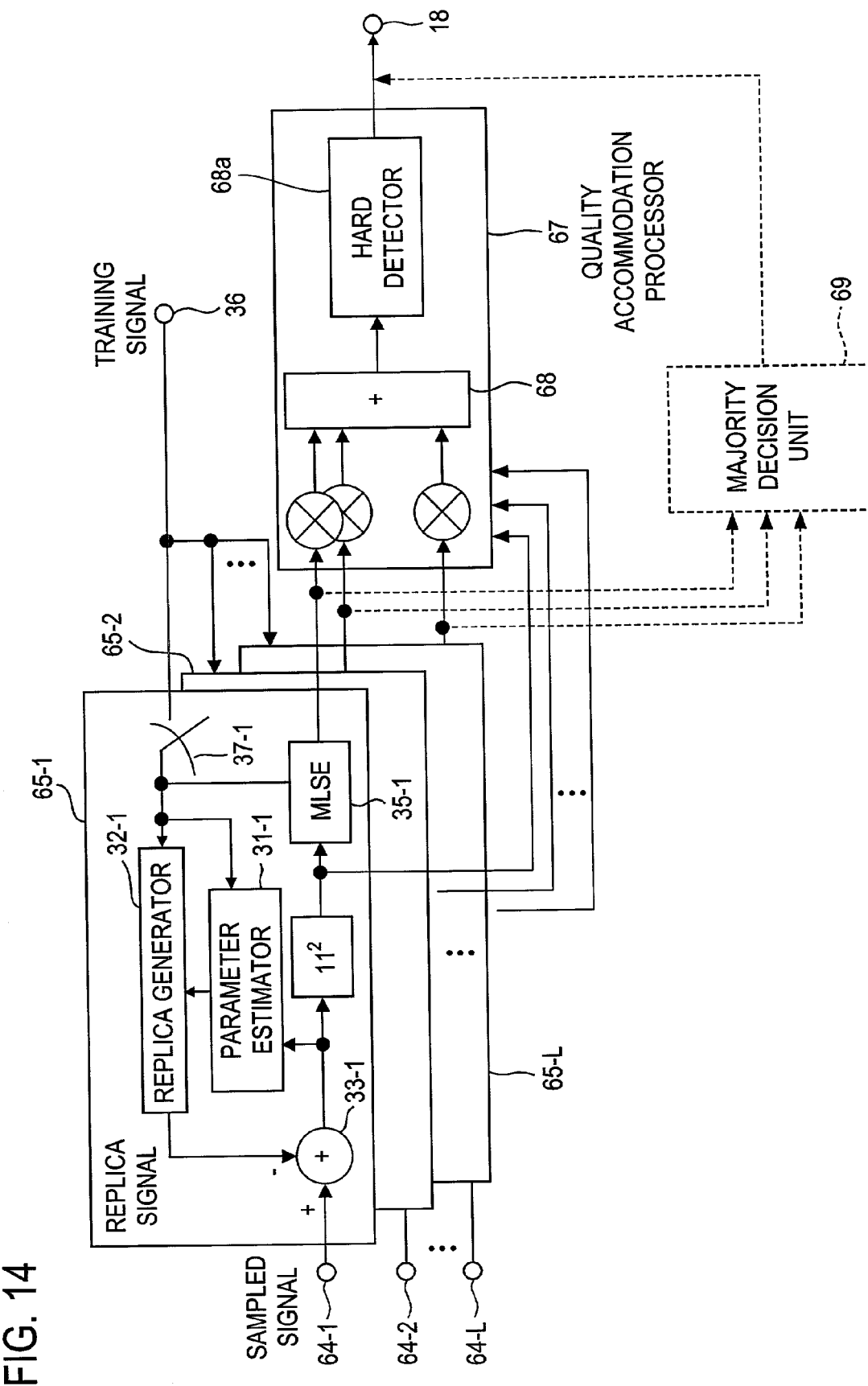
FIG. 14 is a schematic view of another functional arrangement of the adaptive equalizer 63 shown in FIG. 12.

As shown in FIG. 14, it is also possible to provide one of MLSE processors 35-1 to 35-L in each of the estimated error output sections 65-1 to 65-L so that an equalization processing may be independently applied for each symbol sync timing, and outputs from the MLSE processors 35-1 to 35-L may be fed to a quality accommodation processor 67 where the outputs are processed in accordance with the quality of communication to provide a final output. In this instance, to provide a processing in accordance with the quality of communication, an output from the equalizer (processed output from MLSE) may be used to render a majority decision in a majority decision unit 69, as indicated in broken lines in FIG. 14, or weights which depend on the magnitude of squares of error signals from the adders 33-1 to 33-L which corresponds to the outputs from MLSE processors 35-1 to 35-L may be applied to these outputs and the results added together in an adder 68, with the added signal being digitized into a binary signal in a hard detector 68a to be delivered. For the latter choice, a received signal with a reduced estimated error may be judged as having a high quality communication to be given a greater weighting.

Figure 15:
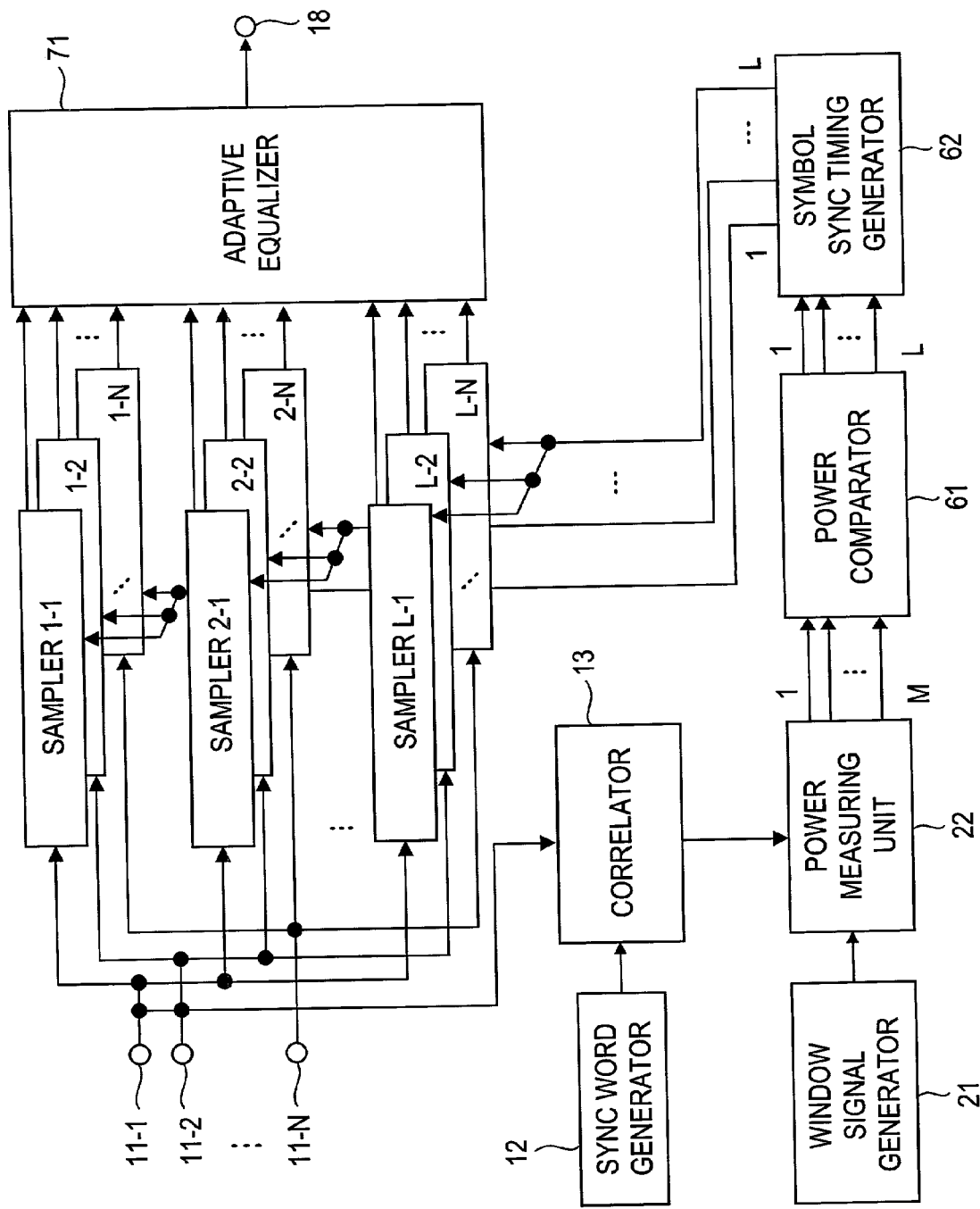
FIG. 15 is a schematic view of an exemplary functional arrangement when an adaptive array antenna processing combiner is used in the fourth embodiment.

Alternatively, it is also possible to use the adaptive array antenna processing combiner as in the third embodiment. Such an arrangement is shown in FIG. 15. Received signals from input terminals 11-1 to 11-N are sampled by samplers 1-1 to 1-N using a first symbol sync timing signal fed from a symbol sync timing generator 62, sampled by samplers 2-1 to 2-N using a second symbol sync timing signal, . . . and sampled by samplers L-1 to L-N using an N-th symbol sync timing signal to be input to an adaptive equalizer 71.

Figure 16:
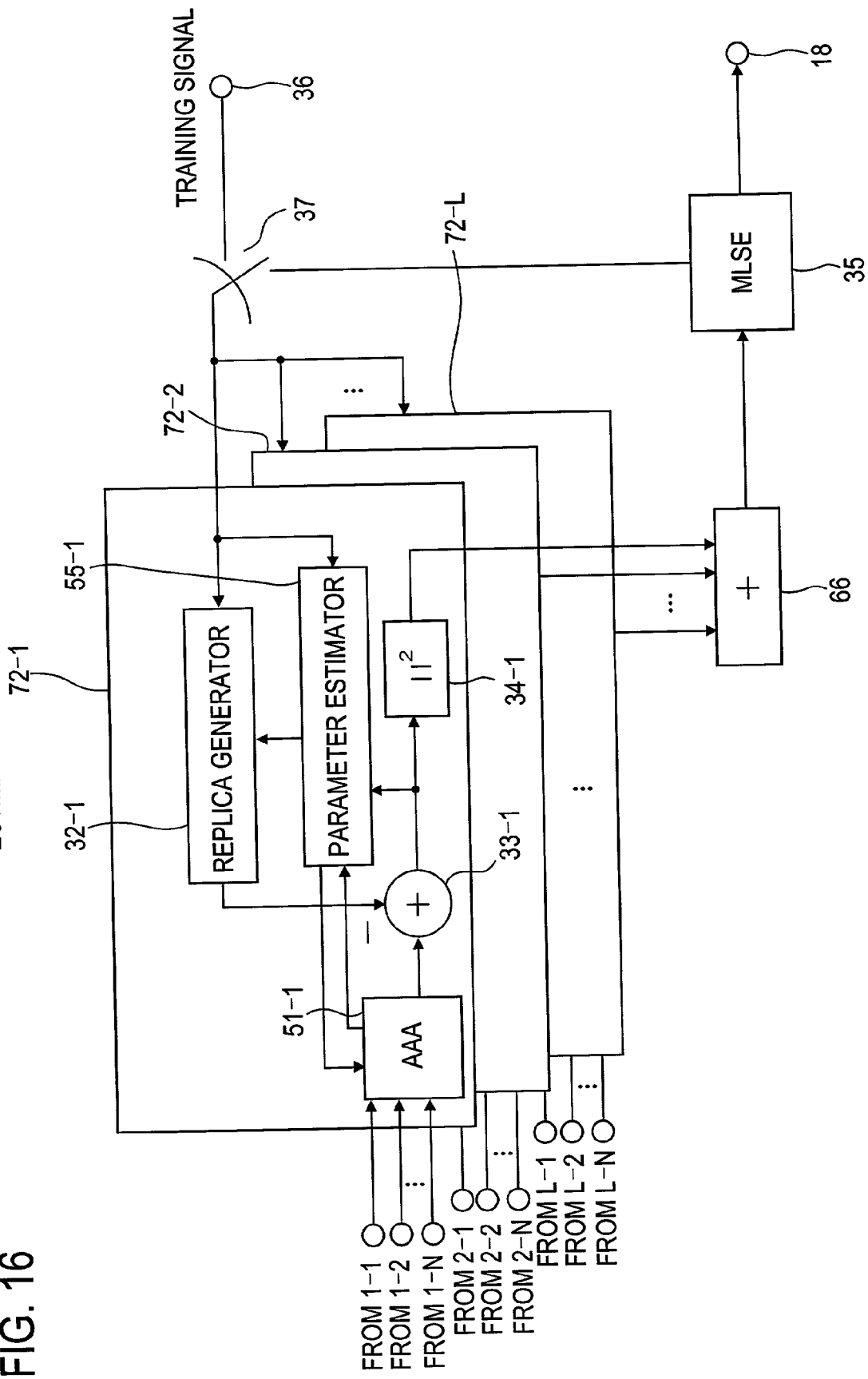
FIG. 16 is a schematic view of an exemplary functional arrangement of an adaptive equalizer 71 shown in FIG. 15.

As shown in FIG. 16, in the adaptive equalizer 71, outputs from the samplers 1-1 to 1-N are input to a estimated error output section 72-1, which is constructed in the similar manner as shown in FIG. 10, comprising a replica generator 32-1, an error calculation adder 33-1, an error squarer 34-1, an adaptive array antenna processing combiner 51-1, and a parameter estimator 55-1. Outputs from the samplers 2-1 to 2-N to outputs from samplers L-1 to L-N are input to estimated error output sections 72-2 to 72-L, respectively. It is to be understood that each of the estimated error output sections 72-2 to 72-L is constructed in the similar manner as the timing corresponding processor 72-1. Squared error signals from the timing corresponding processors 72-1 to 72-L are added together in an adder 66 to be input to an MLSE processor 35.

By using the adaptive array antenna, the paths whose delay time exist outside the equalization range of the adaptive equalizer can be eliminated, allowing the transmission performances to be further improved.

It is premised in the above description that required parts are provided for N channels, but it should be understood that the parts may be used in a time division manner to realize the described processing with a hardware of a scale less than L channels, thus allowing a reduction in the scale of hardware required.

As described, this embodiment allows more paths to be combined by using a plurality of symbol sync timings, thus improving the transmission performances.

Fifth Embodiment

Figure 17A:
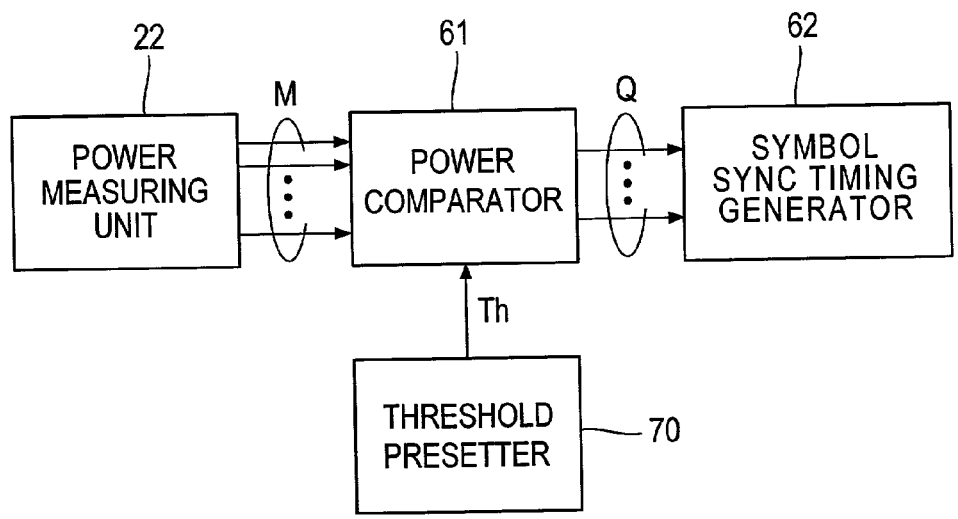
FIG. 17A is a schematic view of an example in which a timing is detected on the basis of a power sum which exceeds a threshold.

In a fifth embodiment of the invention, rather than selecting L timings fixedly in the sequence of greatest power sums when generating symbol sync timings as described in connection with the fourth embodiment in the power comparator 61 shown in FIGS. 12 and 15, a threshold Th is previously set up in a threshold presetter 70 as shown in FIG. 17A, and Q values of the power sums from the powers measuring unit 22 (where Q is an integer satisfying $1 \leq Q \leq L \leq M$) which are found to exceed the threshold Th in a power comparator 61 are used to generate Q symbol sync timings. This operation allows Q values to be selected adaptively in accordance with the situation of the communication, and this enables an equalization to be omitted for a symbol sync timing which is determined for a window signal of a power sum that is ranked within L-th place from the maximum power sum, but which has a small magnitude to prohibit an expectancy of improving the reception characteristic if the equalization is applied, thus allowing a total amount of equalization processing to be reduced. It is to be understood that when the "selection of L timings" is called for in the claims, L does not refer to any specific value, but represents the number of power sums which exceed the threshold value.

Figure 17B:
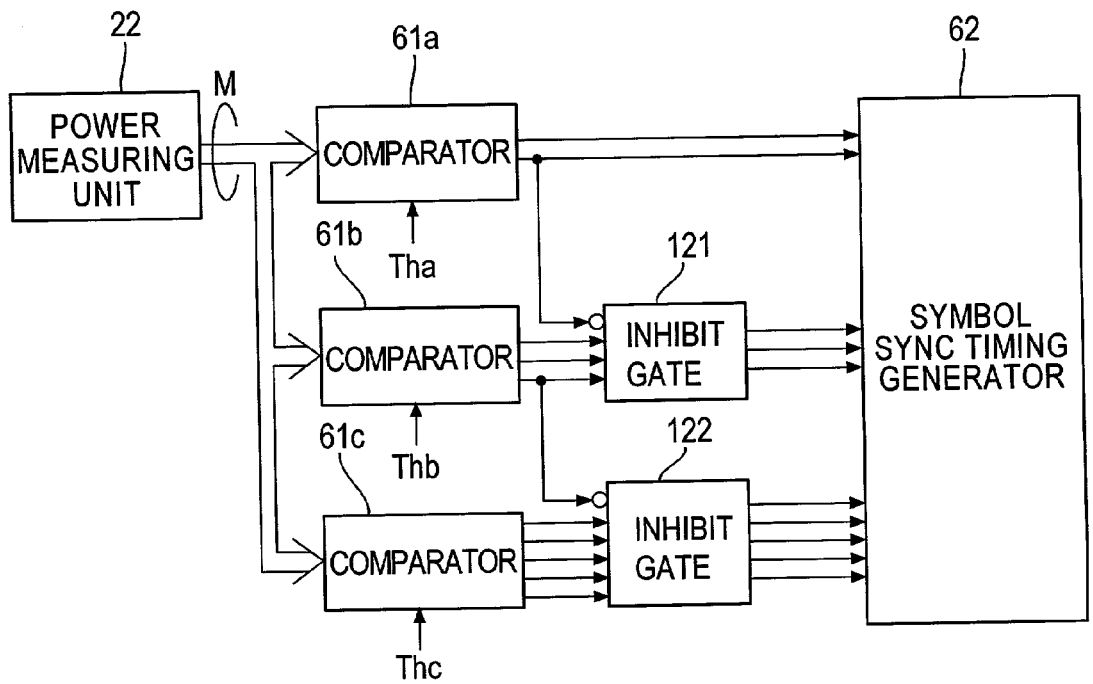
FIG. 17B is a schematic view of a functional arrangement which illustrates the detection of a number of timings which depends on the magnitude of the power sum.

In addition, when the power sums within the window signals are obtained at several best ones of the selected L timings which are sufficient to provide a satisfactory transmission performances, the equalization for the symbol sync timings which are based on smaller power sums can be dispensed with, allowing a reduction in the volume of calculations required for the equalization without substantially detracting from the transmission performances. Thus, if there is a predetermined number (such as one or two, for example) of power sums which exceed a relatively high threshold, the equalization may be applied to only those symbol sync timings which are obtained on the basis of the power sums exceeding such threshold. By way of example, FIG. 17B shows that M power sums from the power measuring unit 22 are fed to power comparators 61a, 61b and 61c where they are compared with thresholds Tha, Thb and The (where Tha>Thb>Thc) respectively. Each of the power comparators 61a, 61b and 61c delivers one or more of M input power sums which have exceeded the threshold established therein. The threshold Tha is set up so that one or two power sums can be delivered from the power comparator 61a in good tansmission performances condition and other thresholds are set up so that the power comparator 61b delivers three or four power sums while the power comparator 61c deliver five to seven power sums. An output from the power comparator 61b is fed to an inhibit gate 121, which is disabled or inhibited by an output from the power comparator 61a which exceeds the threshold. An output from the power comparator 61c is fed to an inhibit gate 122, which is disabled or inhibited by an output from the power comparator 61b which exceeds the threshold thereof. The outputs from the power comparator 61a and the inhibit gates 121 and 122 are input to a symbol sync timing generator 62, which delivers symbol sync timing signals for timings which correspond to the respective input power sums.

In this embodiment, the value of Q varies, presenting a problem how many channels should be provided for the replica generator or the parameter estimator. It is contemplated that a sufficient number of channels be provided if the scale of the hardware affords to it, and when the value of Q is small, part of the channels may be utilized. In this instance, there is a merit that the power dissipation can be reduced in comparison to the power dissipation which results when the entire hardware is operated. If it is desired to reduce the scale of the hardware, the replica generator and/or parameter estimator may be utilized in a time division manner as described above in connection with the fourth embodiment.

Sixth Embodiment

Figure 18:
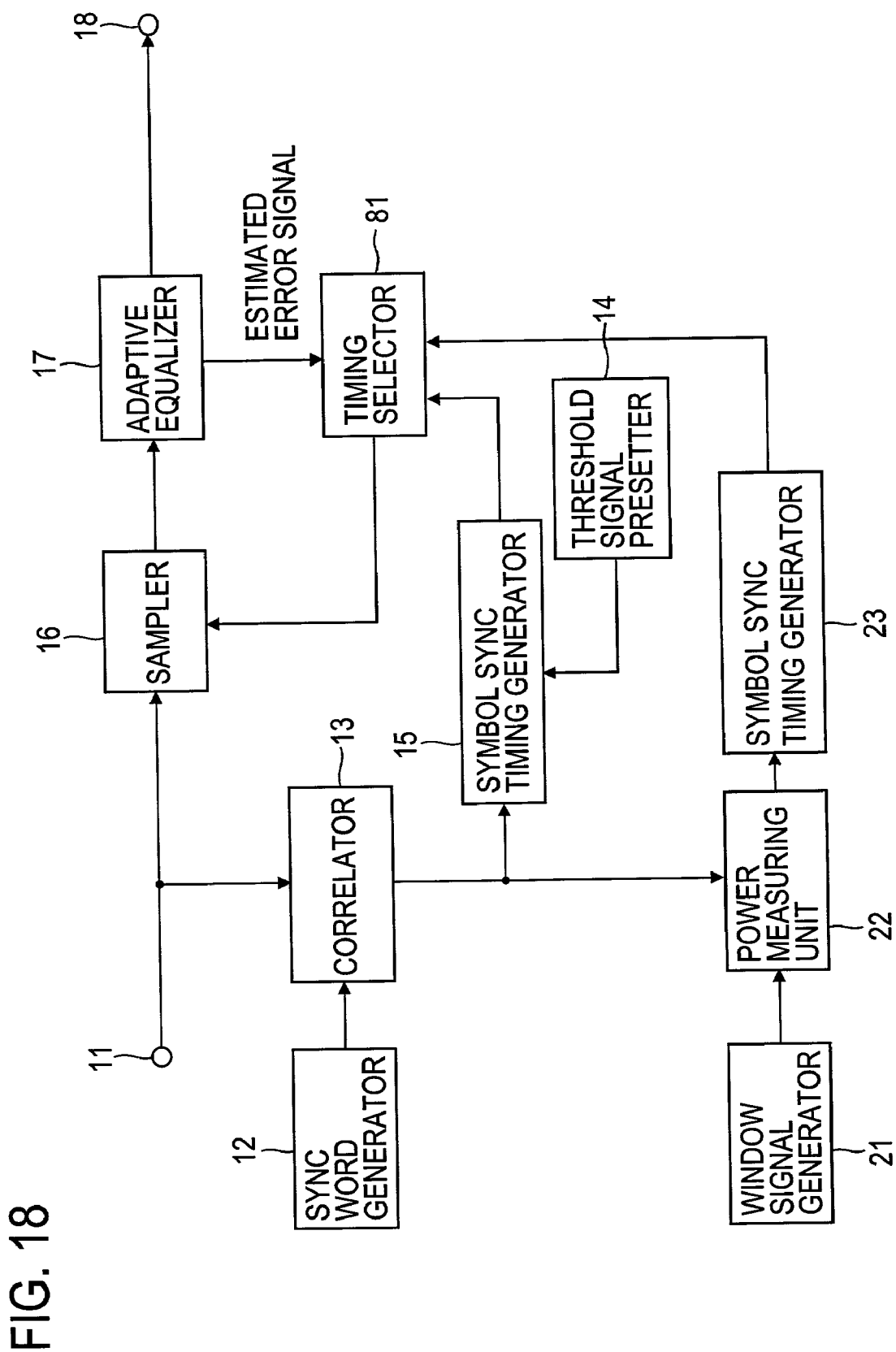
FIG. 18 is a schematic view showing a functional arrangement of a sixth embodiment of the invention.

A functional arrangement of a sixth embodiment of the invention is shown in FIG. 18. In this embodiment, there are provided a pair of symbol sync signal generators. Thus, in addition to a symbol sync signal generator 23 which generates a symbol sync timing signal at a timing when a power sum from the power measuring unit 22 shown in FIG. 3 is at its maximum, there is also provided a conventional symbol sync signal generator 15 as shown in FIG. 1, thus generating a symbol sync timing at a timing when the correlation output signal exceeds the threshold determined by the threshold signal presetter 14 or at the timing of the 1st arrival path of the received signal.

A timing selector 81 switches between the symbol sync timing signals from the symbol sync timing generators 15 and 23 to feed a sampler 16. In this embodiment, the adaptive equalization processing with respect to the sampled signal at each symbol sync timing takes place in a time division manner, for example, and symbol sync timing signals used for equalization are determined in accordance with the quality of the communication. The quality of the communication may be defined by estimated error signals which occurs at the last training symbol which takes place with each symbol sync timing signal. The timing selector 81 may be controlled to effect a equalization at timing where the estimated error power is minimized, by comparing with the magnitude of the error signals.

Seventh Embodiment

Figure 19:
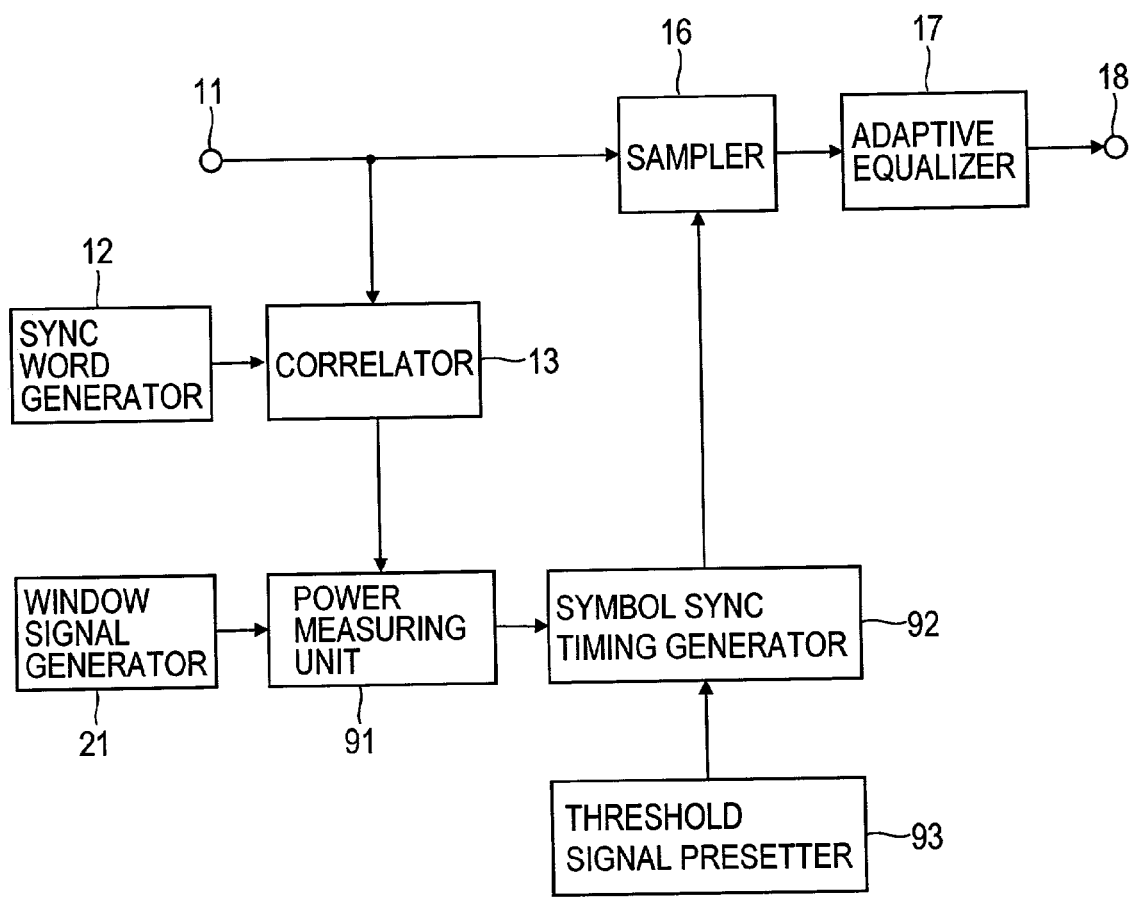
FIG. 19 is a schematic view showing a functional arrangement of a seventh embodiment of the invention.

A functional arrangement of a seventh embodiment of the invention is shown in FIG. 19 where corresponding parts to those shown in FIG. 3 are designated by like reference numerals as used before. In this embodiment, a power measuring unit 91 sequentially deliver power sums of the correlation output signal which exist in the sequentially offset window signals #1, #2, #3 . . . shown in FIG. 4B to be input to a symbol sync timing generator 92, which generates a symbol sync timing signal on the basis of the timing of the particular window signal where the input power sum has exceeded a threshold signal which is set up in a threshold signal presetter 93 for the first time. In other respects, the arrangement is similar to FIG. 3. Also in the seventh embodiment, the power sums from the correlation output signal may comprise a sum of samples obtained by a sampler 16 at a given sampling interval.

Eighth Embodiment

Figure 20:
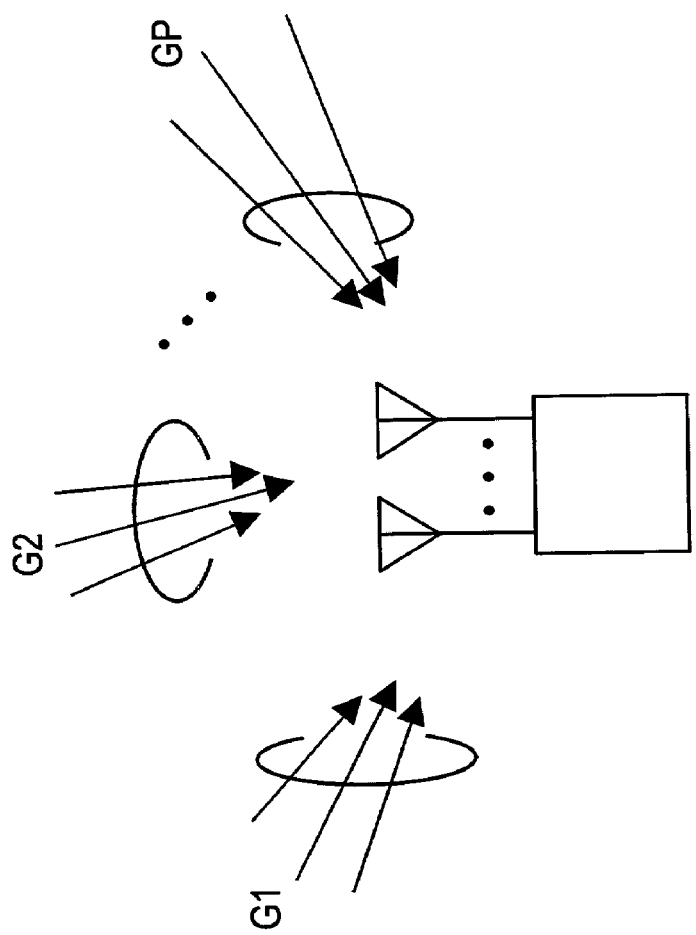
FIG. 20A is an illustration of incoming paths which are divided into groups having different directions.
FIG. 20B illustrates an example in which delay times of received signals have a large difference between paths having different directions.
Figure 20:
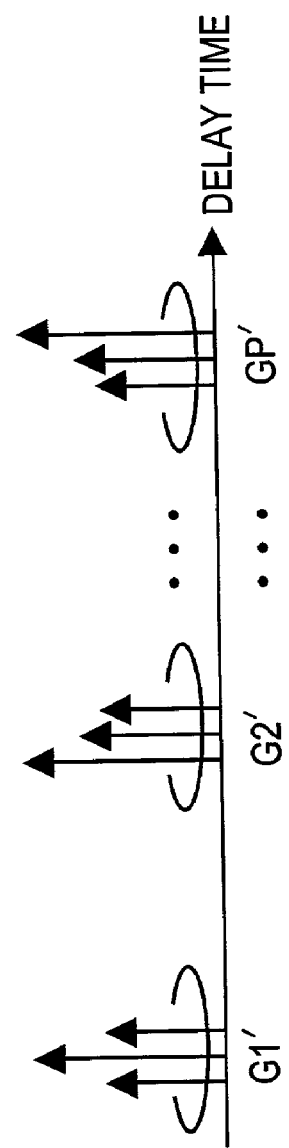

In a channel environment in which incoming paths are divided into several groups G1, G2, . . . GP having different directions as shown in FIG. 20A and received signals G1', G2', . . . GP' from these paths have largely different delay times as shown in FIG. 20B, a satisfactory transmission performances may not be obtained if an adaptive equalizer has a reduced number of taps in the arrangement of the first and the second embodiment (and in the third, the fourth, the fifth and the sixth embodiment as well). In the eighth embodiment, an arrangement is made to provide an effective equalization in such a channel environment.

Figure 21:
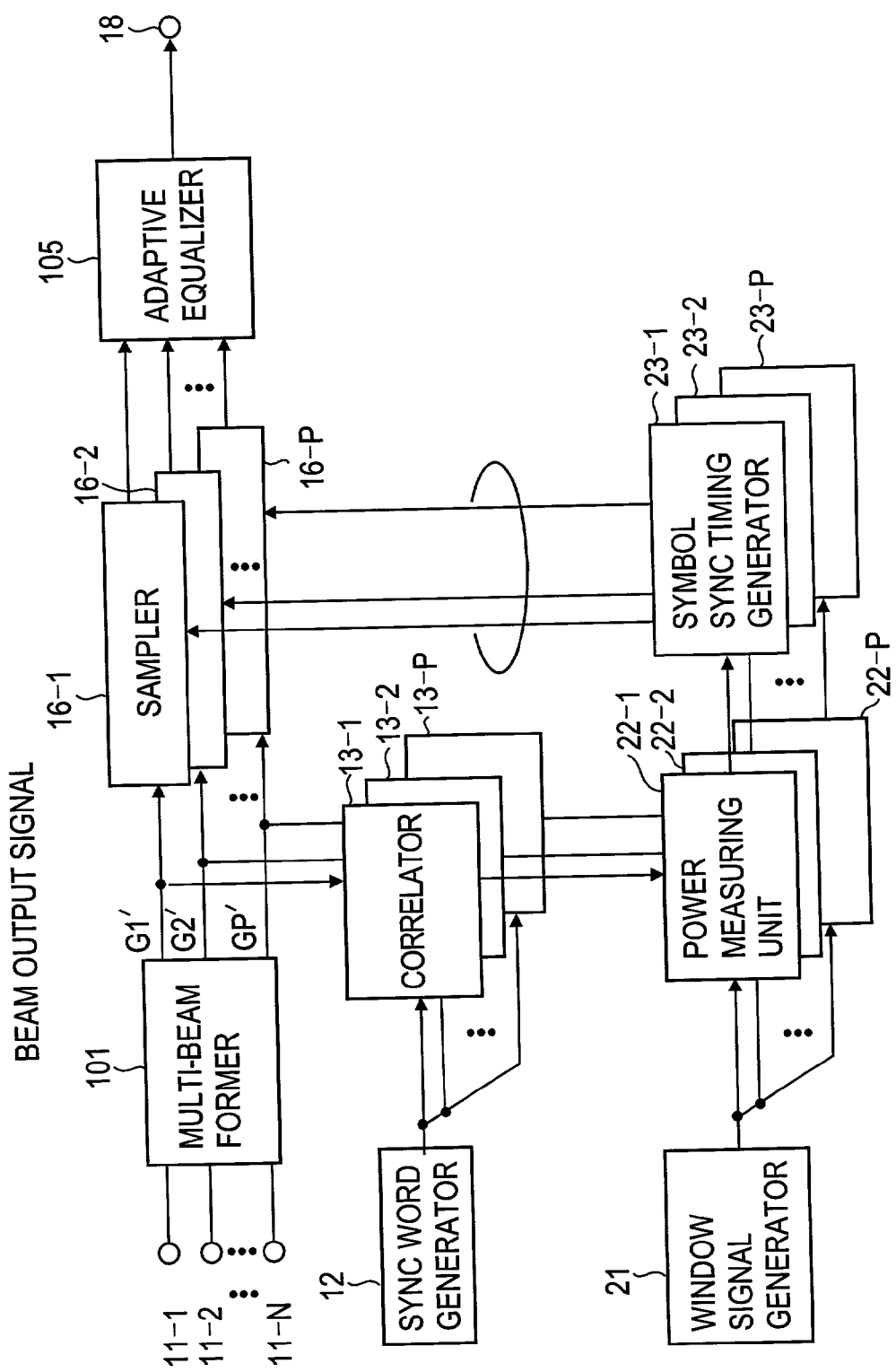
FIG. 21 is a schematic view of a functional arrangement of an eighth embodiment of the invention.

An arrangement of an eighth embodiment is shown in FIG. 21 where corresponding parts to those shown in FIG. 3 are designated by like reference numerals as used before, to which postfix numerals are added. This embodiment employs the arrangement shown in the second embodiment, and in addition, N-channel array antenna received signals are input to input terminals 11-1, . . . 11-N, which are delivered by a multi-beam former 101 as P-channel beam received signals, which are then delivered to P-channel corellators 13-1, . . . , 13-P and to P-channel samplers 16-1, . . . , 16-P. Each of the correlators 13-1, . . . , 13-P forms a correlation between the input received signal of each beam and a sync word signal from a sync word generator 12, and a resulting correlation output signal is used in calculating a power sum, in each of power measuring units 22-1, . . . , 22-P, of the correlation output signal which exists within the extent of a window signal fed from a window signal generator 21. The calculation of the power sums takes place while sequentially shifting the time position of the window signal. The power sums which are sequentially delivered from the power measuring units 22-1, . . . , 22-P are input to symbol sync timing generators 23-1, . . . , 23-P, respectively, where a symbol sync timing is generated using the timing of the particular window signal where a maximum one of the power sums is obtained. Received signals of corresponding beams of samplers 16-1, . . . , 16-P are sampled by using such timing. The sampled outputs from the samplers 16-1, . . . , 16-P are fed to an adaptive equalizer 105.

Figure 22:
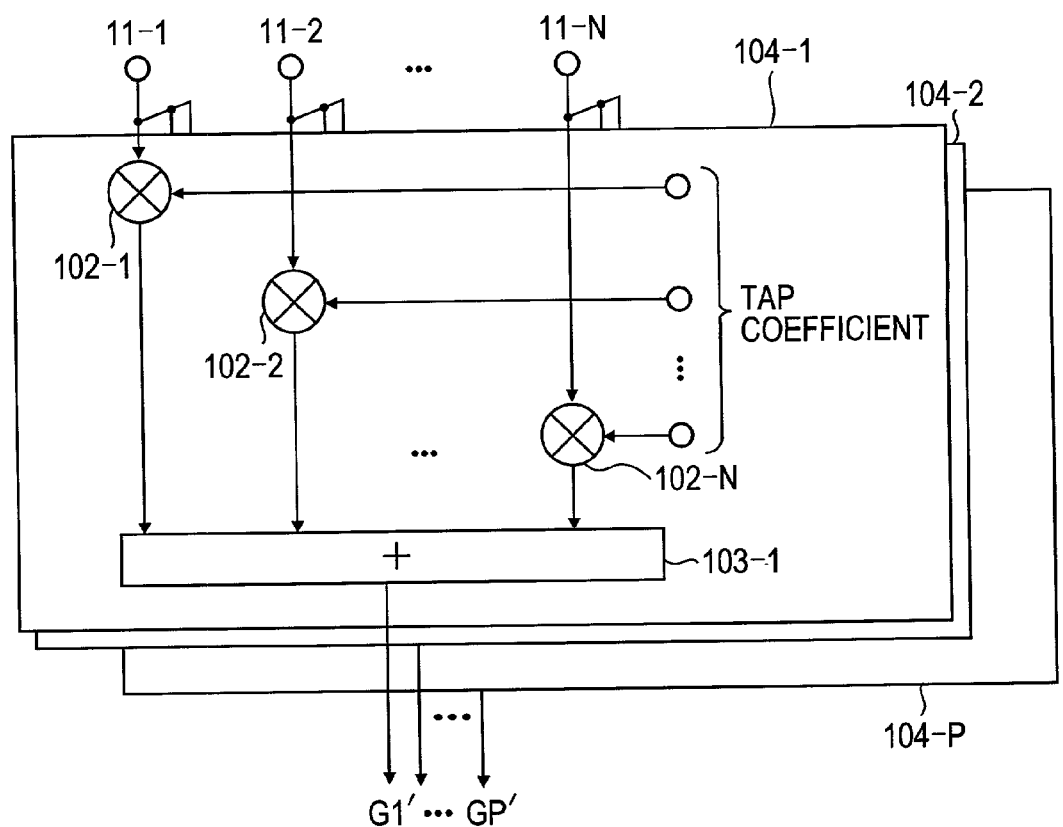
FIG. 22 is a schematic view showing a specific example of a multi-beam former shown in FIG. 21.
Figure 23:
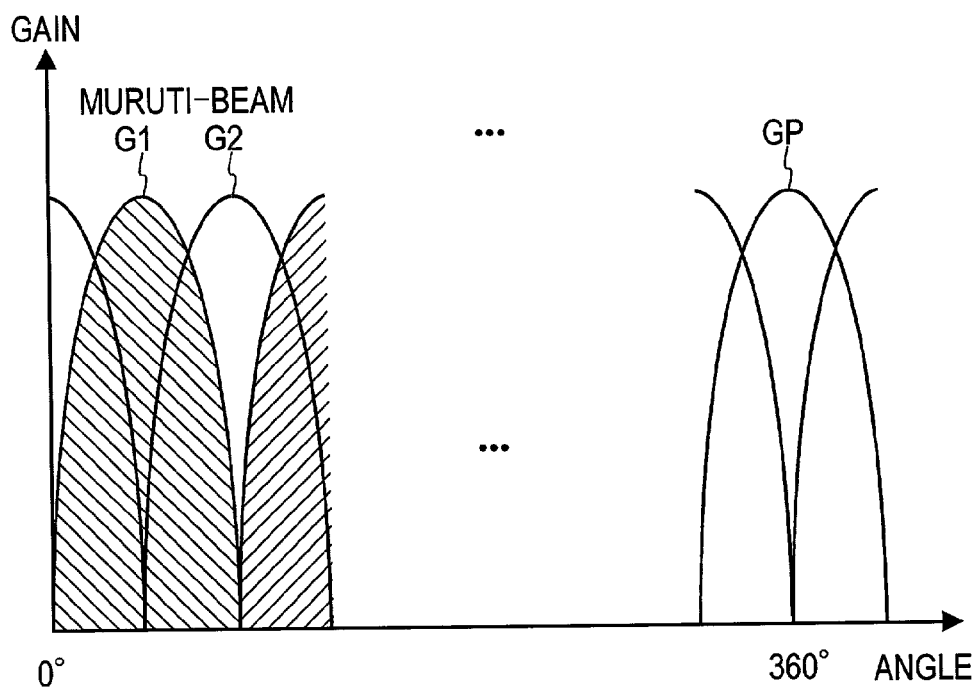
FIG. 23 is an illustration of an exemplary multi-beam.

An exemplary arrangement of the multi-beam former 101 is shown in FIG. 22. In a similar manner as the adaptive array antenna shown in FIG. 11, tap coefficients are multiplied to the input signal from each of antenna reception input terminals 11-1, . . . , 11-N in one of multipliers 102-1, . . . , 102-N, and results of these multiplications are added together in an adder 103-1 to provide an output signal for one beam of the multi-beam. In distinction to FIG. 11 where the tap coefficients are updated adaptively in accordance with the channel condition of signals to the adaptive array antenna to provide a single beam output signal, the multi-beam former 101 delivers a received signal for one beam having a fixed direction using a predetermined tap coefficients independently from the channel condition of the signals, thus providing a plurality of beam formers 104-1, . . . , 104-P having fixed directions. In this multi-beam former 101, P-channel beams are produced by the beam formers 104-1, . . . , 104-P by using P sets of tap coefficients, but these beams are generated so that they have distinct main beam directions so that all of the beams G1, . . . , GP are normally used to cover all of incoming directions, as shown in FIG. 23, for example. A beam which has such characteristic can be easily produced using a Butler Matrix, for example. FIG. 23 shows an example of a multi-beam which is formed by using the Butler Matrix (see, for example, J. Ltva and T. K. Lo, "Digital Beamforming in Wireless Communications", Artech House, Boston London, pp. 22–34 (1996)).

Figure 24:
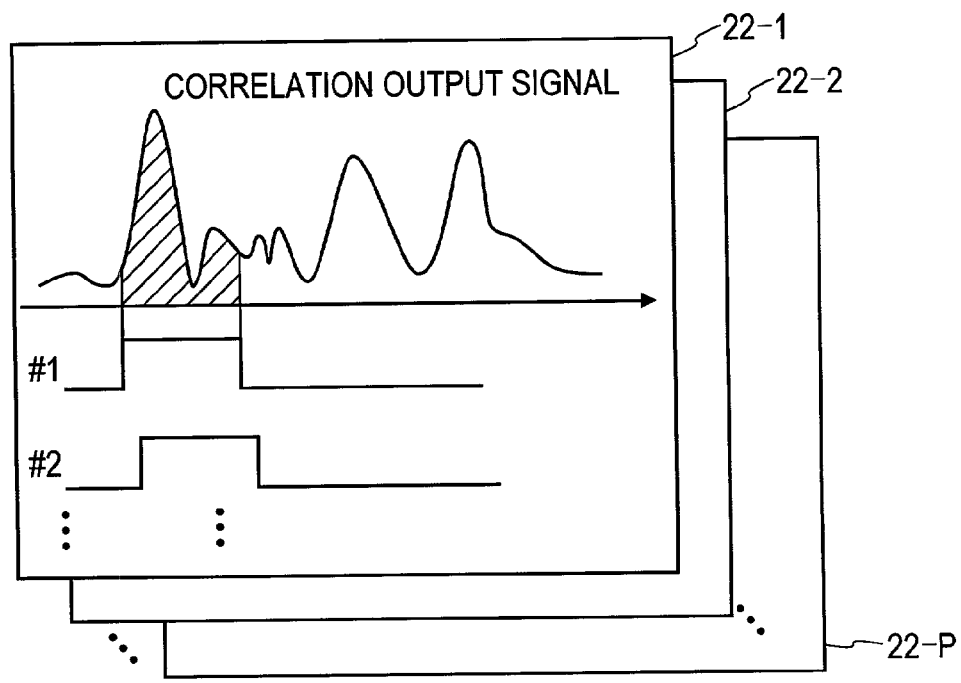
FIG. 24 is a schematic view illustrating an operation of generating a symbol sync timing in the embodiment shown in FIG. 21.

The P-channel multi-beam received signals G1', . . . , GP' which are provided by the multi-beam former 101 are input through the correlators 13-1, . . . , 13-P and the power measuring units 22-1, . . . , 22-P to the symbol sync timing generators 23-1, . . . , 23-P, respectively, thus generating P symbol sync timing signals. These P symbol sync timing signals are used to generate P-channel sampled signals from P-channel beam received signals G1', . . . , GP' in the samplers 16-1, . . . , 16-P. Each of the symbol sync timing generators 23-1, . . . , 23-P provides a symbol sync timing which occurs at a timing where the respective powers sum obtained in the power measuring units 22-1, . . . , 22-P is at its maximum in a similar manner as described above with reference to FIG. 4, as indicated in FIG. 24. In FIG. 21, a correlator, a power measuring unit, a symbol sync timing generator and a sampler are provided for each beam channel, but it should be understood that these parts may be used in a time division manner between the channels.

Figure 25:
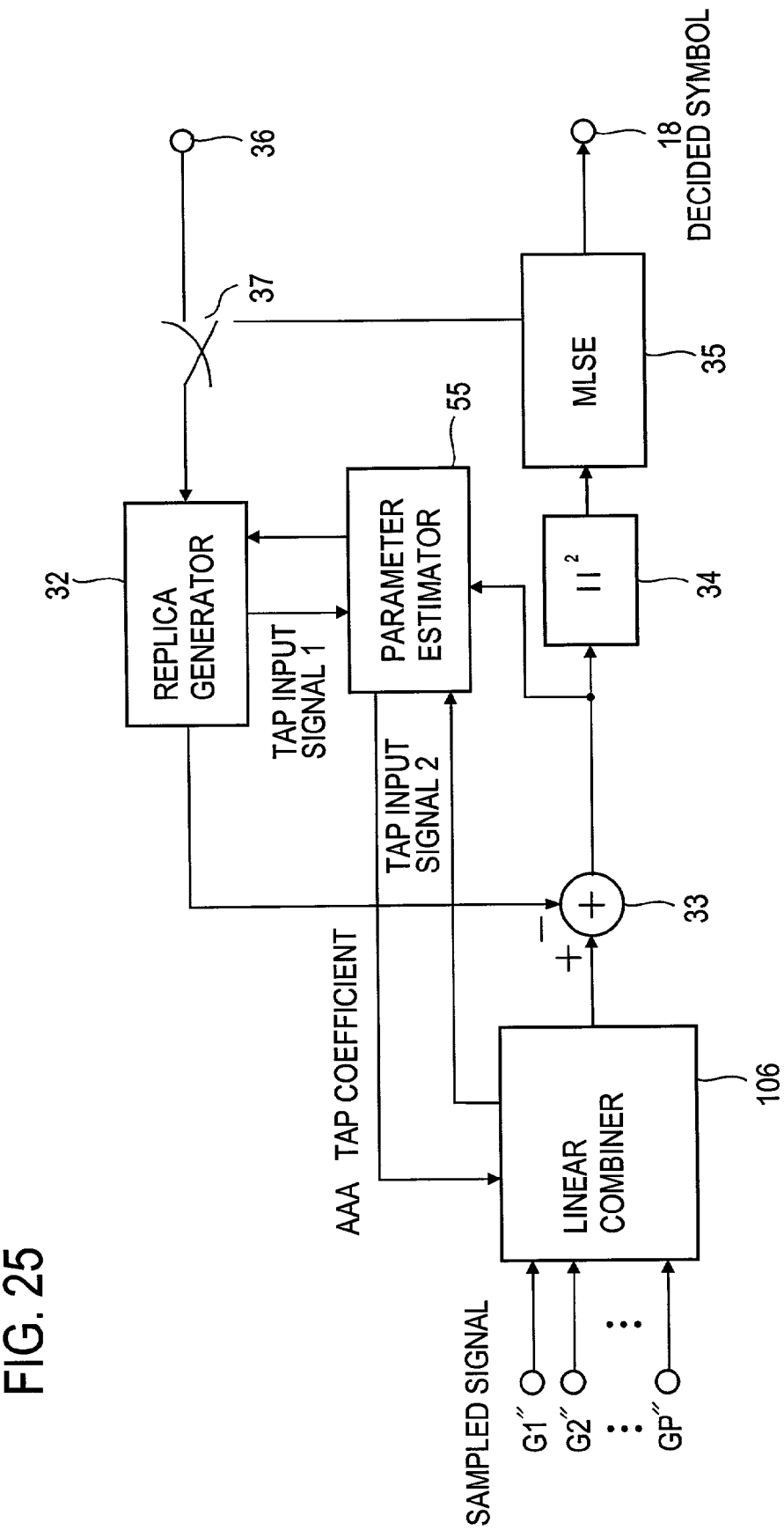
FIG. 25 is a schematic view showing an exemplary specific functional arrangement of an adaptive equalizer 105 shown in FIG. 21.

The P-channel sampled signals which are generated in this manner are input to an adaptive equalizer 105 where an equalization processing is applied. An exemplary arrangement of the adaptive equalizer 105 which is used in this embodiment is shown in FIG. 25 where corresponding parts to those shown in FIG. 10 are designated by like reference numerals as used before. P-channel sampled signals from the samplers 16-1, . . . , 16-P are weighted and combined in a linear combiner 106, and the equalization processing is applied to the combined signal. The detail of the equalizing processing remains similar to the third embodiment. Thus, the linear combiner 106 corresponds to the adaptive array antenna processing combiner 51 shown in FIG. 10. Tap coefficients for the linear combiner 106 may be fixed.

By detecting the symbol sync timing for each beam having a different direction of the multi-beam, it is possible to detect the symbol sync timing by utilizing the space domain in addition to the time domain as illustrated in FIG.

24. Where the received signals between the groups of incoming paths G1, ..., GP have largely different delay times and are spatially spaced apart as exemplified by the paths of incoming signals shown in FIG. 20, the received signals may be separated in the space domain, and the symbol sync timing may be detected for each separated received signal, thus assuring that a satisfactory transmission performances can be obtained if the equalization range of the adaptive equalizer 105 is limited.

The technique of achieving the symbol synchronization with respect to the received signal of each beam according to the invention by using the multi-beam generator 101 shown in FIG. 21 may be applied to any one of the first to the seventh embodiment mentioned above. When L timings which provide greatest power sums as shown in FIG. 12 are used, L samplers may be provided for each of the samplers 16-1, ..., 16-P shown in FIG. 21. In other words, an arrangement may be made which is similar to feeding P output signals from the multi-beam generator 101 to the input terminals 11-1, ..., 11-N shown in FIG. 15, and the arrangement of the adaptive equalizer 105 may be similar to that shown in FIG. 16, for example.

Ninth Embodiment

Figure 26A:
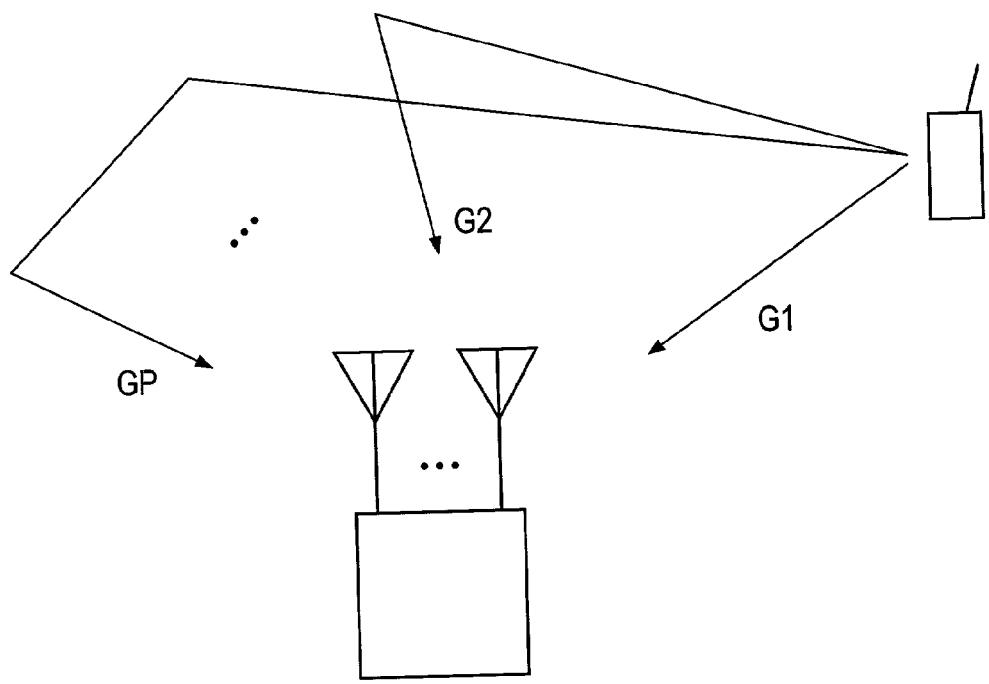
FIG. 26A is an illustration of radio wave oncoming paths which are divided into different directions.
Figure 26B:
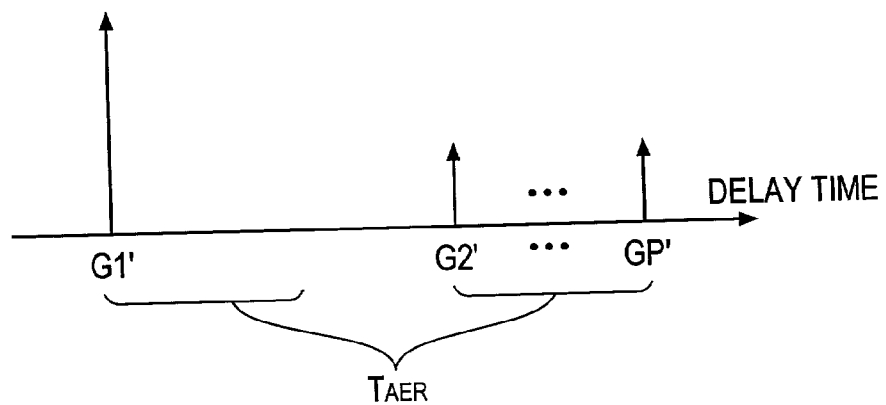
FIG. 26B is an illustration of a plurality of paths where one path has an increased received power and other paths have a reduced received power with greatly different delay times.

Suppose a channel environment in which signals are oncoming on a plurality of paths G1, ..., GP as shown in FIG. 26A and where one of received signals from a path, G1', having a relatively higher received power than received signals G2', ..., GP' of the remaining paths is incoming with a time offset from the remainder. In this instance, when one of the arrangements shown in the first to the eighth embodiment is used, the symbol sync timing will be aligned such that the received signal G1' from the single path having an increased power is located within the window signal, and the received signals G2', ..., GP' from the remaining paths will be located outside the equalization range $T_{AER}$. As a consequence, although the power in the equalization range $T_{AER}$ is maximized, a satisfactory path diversity gain cannot be obtained because there is only one path, resulting in a failure to provide a good transmission performances under a fading environment. The ninth embodiment is directed to provide a good reception characteristic in such a channel environment.

Figure 27:
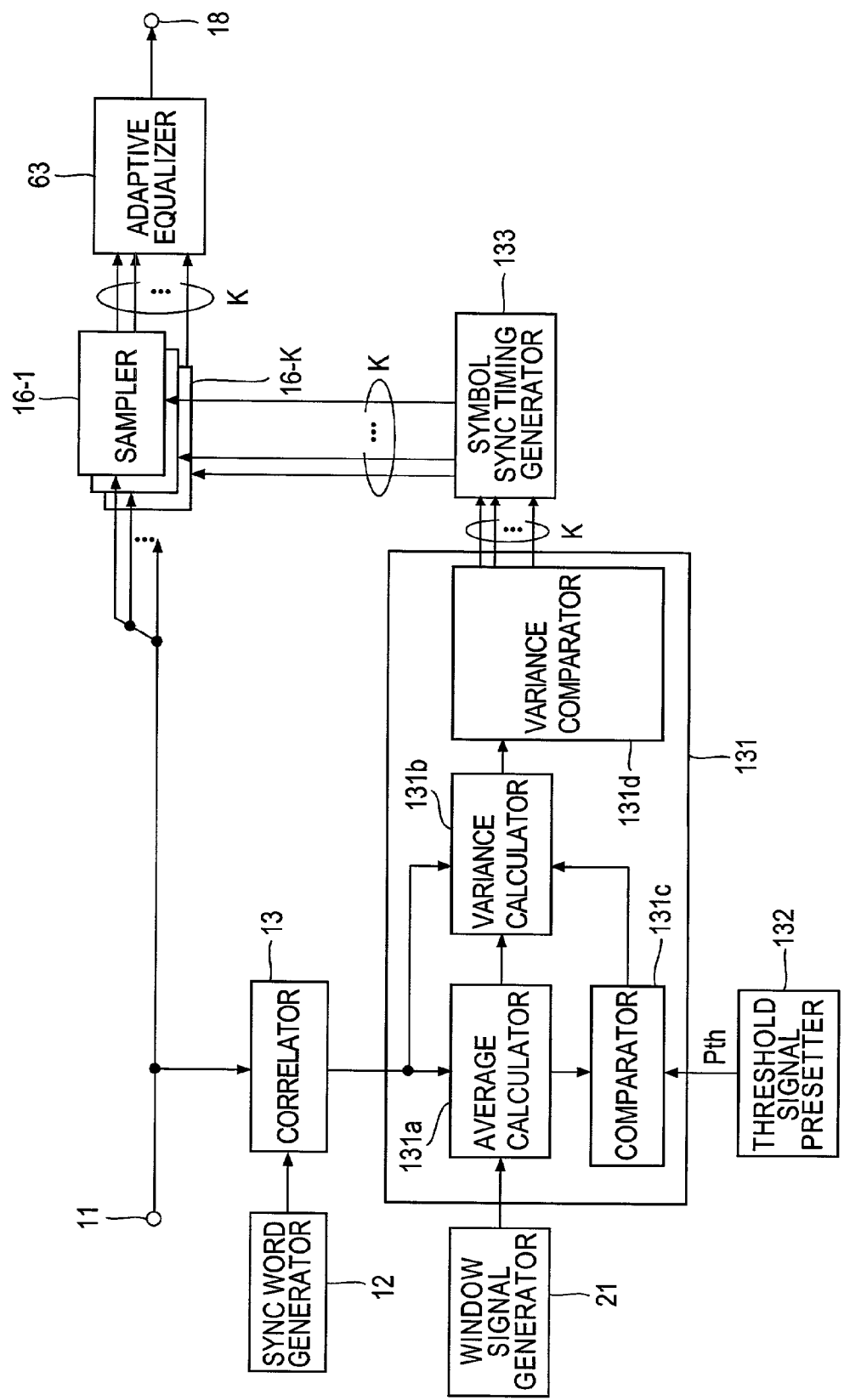
FIG. 27 is a schematic view showing a functional arrangement of a ninth embodiment of the invention.

A functional arrangement of the ninth embodiment is shown in FIG. 27 where corresponding parts to those shown in FIG. 12 are designated by like reference numerals as used before. This embodiment is characterized in that the power measuring unit 22 which is used in the first to the eighth embodiment is replaced by a power variance measuring unit 131. The power variance measuring unit 131 receives a window signal from a window signal generator 21 and a threshold signal Pth delivered from a threshold signal presetter 132 to measure the power of a correlation output signal for each sample within the window signal. The measuring unit 131 includes a mean value calculator 131a which calculates a power mean value $P_N$, and a variance calculator 131b which calculates a power variance $\sigma^2$. The measuring unit 131 also includes a comparator 131c which compares the calculated power mean value Pn against the threshold signal Pth. K power variances $\sigma^2$ (where K is an integer equal to or greater than 1) corresponding to power mean values Pn which have been determined by the comparator 131c as exceeding the threshold signal Pth and which may be chosen in an ascending order of the variance are selectively delivered to a variance comparator 131d. The value of K may be determined in consideration of the scale of the hardware. Denoting a sample value of a correlation output signal which is located within the window signal by x(n), and the number of samples within the window signals by N, the variance $\sigma^2$ is determined as $$\sigma^2 = (1/N) \sum_{n=1}^{N} (x(n) - P_N)^2.$$

The power variance $\sigma^2$ which is delivered from the power variance measuring unit 131 is input to a symbol sync timing generator 133, which delivers a symbol sync timing signal on the basis of the timing which corresponds to each of K power variances $\sigma^2$, for example, the timing of a rising edge of a corresponding window signal. For example, when the variance in the window signal is equal to 0, this means that the path has a uniform power at every sample point within the window signal, allowing a path diversity gain to be maximized through the adaptive equalization. When the symbol sync timing signal is generated by the process mentioned above, samplers 16-1 to 16-K produce sampled signals from the received signals, and these sampled signals are fed to an adaptive equalizer 63 which applies an equalization processing. The adaptive equalizer 63 of this embodiment may be constructed in the similar manner as that shown in FIGS. 13 and 14.

When the ninth embodiment is used, the symbol sync timing can be detected where there exist multiple paths within the equalization range even though the combined signal power is not necessarily at its maximum, thus allowing a good transmission performances to be expected under a fading environment by virtue of the path diversity gain.

Tenth Embodiment

Figure 28:
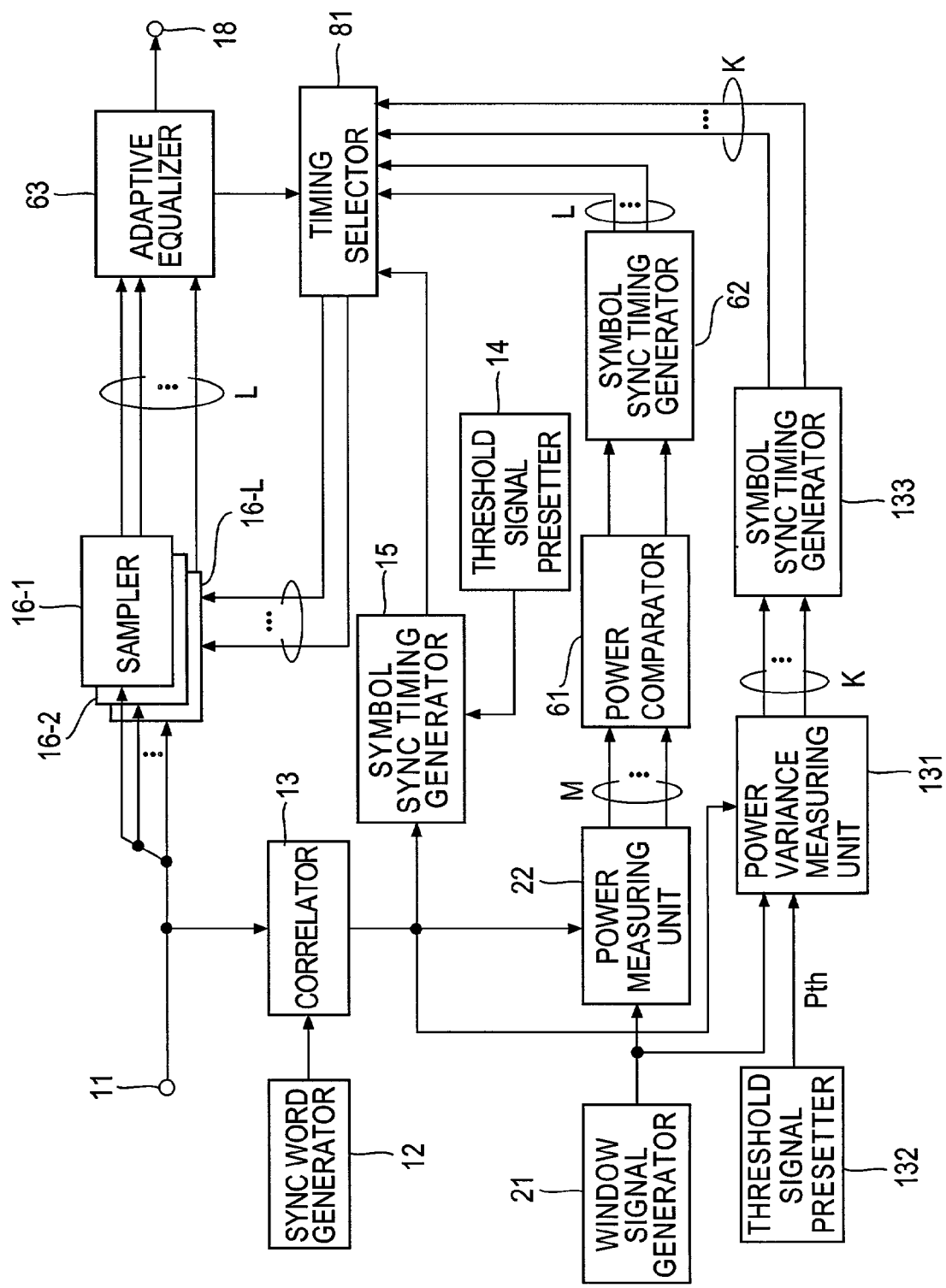
FIG. 28 is a schematic view showing a functional arrangement of a tenth embodiment of the invention.

A tenth embodiment is shown in FIG. 28, and represents a modification of the sixth embodiment shown in FIG. 18 by adding the power variance measuring unit 131 shown in FIG. 27. While there were two symbol sync generators 15 and 23 (which is shown at 62 in FIG. 28) in the sixth embodiment, a third symbol sync timing generator 133 is provided. A timing selector 81 switches between the symbol sync timing signals from the symbol sync timing generators 15, 62 and 133 to feed samplers 16-1 to 16-L (or 16-K). A number of samplers are provided which corresponds to a greater one of L and K.

In a similar manner as in the sixth embodiment, the adaptive equalization processing is applied at respective sync timings in a time division manner, and the selection of which one of the symbol sync timing signals is used is determined on the basis of the quality of communication by controlling the timing selector 81.

As a consequence, it is possible to detect a symbol sync timing which is more adequate to the propagation environment, allowing an improvement in the transmission performances. It is to be noted that in FIG. 28, either one of the power measuring unit 22, the power comparator 61 and the symbol sync timing generator 62 on one hand and the threshold signal presetter 14 and the symbol sync timing generator 15 on the other hand may be omitted.

The ninth and the tenth embodiment allow a symbol sync timing to be detected which enables a greater path diversity gain to be achieved in an adaptive equalizer even in a channel environment where signals are incoming on a plurality of paths and one of the paths having a relatively higher received power arrives with a time offset from other paths, thus improving the transmission performances.

It is to be understood that the second embodiment may be applied to each of the arrangements of the seventh and the eighth embodiment, by allowing the power measuring unit 91 or the power variance measuring unit 131 to determine the power sum in the window signal through a process of sampling a correlation output signal which exists within the extent of the window signal at a sampling interval of the sampler 16 or samplers 16-1 to 16-P and determining the power sum or the power variance of the sampled signals. In addition, the sixth, the seventh, the ninth and the tenth embodiment may be modified by changing the adaptive equalizer used into a time and space equalization arrangement which combines the adaptive array antenna processing and the adaptive equalization processing as illustrated in the third embodiment. Furthermore, the conventional symbol sync timing generator 15 shown in FIG. 1 may be used in the seventh and the eighth embodiment as is done in the sixth embodiment, allowing the both symbol sync timing signals to be selectively used in accordance with the quality of communication. Where K is greater than one in the ninth and the tenth embodiment, the adaptive equalization processing illustrated in FIG. 13 or 14 may be applied. Finally, the ninth and the tenth embodiment can be applied to a multi-beam reception as illustrated in the eighth embodiment.

Each of the described embodiments can exercise its function by the execution of a program in a computer.

As described above, the present invention allows a symbol sync timing to be detected which makes an equalization processing by an adaptive equalizer to be more effective, thus permitting the reception characteristic to be improved.

What is claimed is:

1. An adaptive equalization apparatus comprising
   a sync word generator for delivering a sync word signal sequence which is the same as a sync word transmitted by a transmitter;
   a correlator for receiving the sync word signal and a received signal and for calculating a correlation between the received signal and the sync word to deliver a correlation value as a correlation output signal;
   a power variance measuring unit for receiving the correlation output signal and a threshold value as inputs, for determining a mean value and a variance of the correlation output signal within a given time span while shifting the time span in the time domain, and for delivering K variances (where K is an integer equal to or greater than 1) at timings where the mean value is greater than the threshold signal;
   a symbol sync timing generator for generating K symbol sync timing signals on the basis of the timings;
   a sampler for sampling the received signal using the K symbol sync timing signals;
   and an adaptive equalizer for receiving the sampled received signal as an input and for applying an adaptive equalization to the received signal to deliver a decided symbol.

2. An adaptive equalization apparatus according to claim 1, further comprising
   a second symbol sync timing generator for generating a symbol sync timing signal on a basis of a timing of a $1^{st}$ arrival path;
   and a timing selector for switching a timing to be delivered to the sampler between the symbol sync timing signal from the first mentioned symbol sync timing generator and the symbol sync timing signal from the second symbol sync timing generator adaptively in accordance with the quality of communication.

3. An adaptive equalization apparatus according to claim 1, further comprising
   a power measuring unit for receiving a correlation output signal as an input and for determining a power sum of the correlation output signal within a given time span while shifting the time span in the time domain;
   a second symbol sync timing generator for determining L timings whose power sums power sums (where L is an integer equal to or greater than 1) are obtained from the power sums calculated by the power measuring unit and for delivering symbol sync timing signals on the basis of the L timings;
   and a timing selector for switching a timing to be delivered to the sampler between the symbol sync timing signal from the first mentioned symbol sync timing generator and the symbol sync timing signal from the second symbol sync timing signal generator adaptively in accordance with the quality of communication.

4. An adaptive equalization apparatus according to claims 1, in which the power variance measuring unit is arranged to sample the correlation output signal within the given time span at a sampling period of the sampler and to calculate the power sum or the power variance of the sampled signals.

5. An adaptive equalization apparatus according to claim 1, in which the adaptive equalizer comprises a time and space equalizer which performs an equalization in the time domain and a signal processing in the space domain.

6. An adaptive equalization apparatus according to claim 1 in which said K represents a numeral greater than 1, and the adaptive equalizer comprises estimated error output sections each delivering an error signal power between one of the plurality of sampled received signals and each replica signal, and an adaptive equalization processor to which an error signal power comprising error signal powers from the estimated error output sections added together is input.

7. An adaptive equalization apparatus according to claim 1 in which said K is a numeral greater than 1 and in which the adaptive equalizer comprises a processor which applies an adaptive equalization to the plurality of sampled received signals, and a final processor which applies a processing to the outputs from the adaptive equalization processor in accordance with the quality of communication to deliver a final output.

8. An adaptive equalization apparatus according to claims 1, further comprising
   a multi-beam former for weighting a weight to received signals from a plurality of antennae to form a multi-beam antenna patterns and for delivering the weighted received signals to the sampler;
   there being provided to the correlator, the power measuring unit or the power variance measuring unit and the symbol sync timing generator for each received signal from the multi-beam former, the symbol sync timing signal from the symbol sync timing generator being fed to the sampler to which a corresponding beam received signal is fed.

9. An adaptive equalization method comprising the steps of
   generating a sync word signal sequence which is the same as a sync word transmitted from a transmitter;
   calculating a correlation between a received signal and the sync word signal and delivering a resulting correlation value as a correlation output signal;
   determining a mean value and a variance of the correlation output signal in a given time span while shifting the time span in a time domain and determining K variances (where K is an integer equal to or greater than 1) at timings where corresponding mean values are greater than a threshold;
   generating a symbol sync timing signal on the basis of said timings;
   sampling the received signal using said symbol sync timing signal;

and applying an adaptive equalization to the sampled received signal to determine a decided symbol.

10. An adaptive equalization method according to claim 9, in which a correlation variance signal within the given time span is sampled with a sampling period which is applied to the received signal, and sum of the sampled correlation variance signal is used to calculate a power sum or the power variance of the sampled received signals.

11. An adaptive equalization method according to claim 9, further comprising the steps of
generating a second symbol sync timing signal on a basis of a timing for a $1^{st}$ arrival path;
and adaptively switching between the first mentioned symbol sync timing signal and the second symbol sync timing signal in accordance with the quality of communication to provide a symbol sync timing signal which is used in sampling the received signal.

12. An adaptive equalization method according to claim 9, further comprising the steps of
determining power sums of the correlation output signal in the given time span while shifting the time span in the time domain;
determining timing of L power sums (where L is an integer equal to or greater than 1) selected from the power sums are obtained and generating a second symbol sync timing signal on the basis of the L timings;
and adaptively switching between the first mentioned symbol sync timing signal and the second symbol sync timing signal in accordance with a quality of communication to provide a symbol sync timing signal to be used in sampling the received signal.

13. An adaptive equalization method according to claim 9, further comprising the steps of
determining power sums of the correlation output signal in the given time span while shifting the time span in the time domain;
determining timings of L power sums (where L is an integer equal to or greater than 1) selected from the power sums are obtained and generating a second symbol sync timing signal on the basis of the L timings;
generating a third symbol sync timing signal on a basis of a timing of a $1^{st}$ arrival path;
and adaptively switching between the first mentioned symbol sync timing signal, the second symbol sync timing signal and the third symbol sync timing signal in accordance with the quality of communication to provide a symbol sync timing signal to be used in sampling the received signal.

14. An adaptive equalization method according to claim 9 in which K is a numeral greater than 1 and in which the adaptive equalization comprises calculating an error signal power using each one of the plurality of sampled received signals and each respective replica signal, adding the error signal powers together, and applying an adaptive equalization on the basis of the added error signal powers to render a symbol decision.

15. An adaptive equalization method according to claim 9 in which K is a numeral greater than 1 and in which the adaptive equalization is applied to the plurality of sampled received signals, and the results of applying the adaptive equalization is processed in accordance with the quality of communication to provide a final result.

16. An adaptive equalization method according to claim 9, in which the adaptive equalization comprises an equalization in the time domain and a signal processing in the space domain.

17. An adaptive equalization method according to claim 9, in which a weight is applied to each of received signals from a plurality of antennae to form antenna patterns, the correlation is calculated for a received signal from each beam of the multi-beam, a symbol sync timing signal is determined on the basis of the power sum or the variance, and sampling the received signals with a corresponding symbol sync timing signal.

18. An adaptive equalization apparatus comprising
a sync word generator for delivering a sync word which is the same as a sync word transmitted from a transmitter;
a correlator for receiving the sync word signal and a received signal as inputs, for calculating a correlation between the received signal and the sync word signal and for delivering a correlation value as a correlation output signal;
a power measuring unit for receiving the correlation output signal as an input and for determining a power sum of the correlation output signal in a given time span while shifting the time span in a time domain;
a first symbol sync timing signal generator for selecting L timings whose L power sums are obtained (where L is an integer equal to or greater than 1) by comparing power sums calculated by the power measuring unit with a given reference and for generating and delivering symbol sync timing signals on the basis of the selected L timings;
a second symbol sync timing generator for generating symbol sync timing signals on a basis of a timing for a $1^{st}$ arrival path;
a timing selector for switching a timing between the symbol sync timing signal from the first symbol sync timing generator and the symbol sync timing signal from the second symbol sync timing generator adaptively in accordance with a quality of communication;
a sampler for sampling the received signal using the symbol sync timing signal selected by the timing selector;
and an adaptive equalizer for receiving the sampled received signal and for applying an adaptive equalization thereto to deliver a decided symbol.

19. An adaptive equalization method comprising the steps of
generating a sync word signal sequence which is the same as a sync word transmitted from a transmitter;
calculating a correlation between a received signal and the sync word signal and delivering a resulting correlation value as a correlation output signal;
calculating a power sum of the correlation output signal within a given time span while shifting the time span in a time domain;
selecting L power sums (where L is an integer equal to or greater than 1) by comparing the power sums with a given reference, and generating a first symbol sync timing signal on the basis of a timing where one of the selected power sums is obtained;
generating a second symbol sync timing signal on a basis of a timing for a $1^{st}$ arrival path;
adaptively switching between the first symbol sync timing signal and the second symbol sync timing signal in accordance with a quality of communication to provide a symbol sync timing signal which is used in sampling the received signal;
sampling the received signal using the symbol sync timing signal;
and applying an adaptive equalization to the sampled received signals to determine a decided symbol.

* * * * *